(12) United States Patent
Bailey et al.

(10) Patent No.: US 6,205,508 B1
(45) Date of Patent: Mar. 20, 2001

(54) METHOD FOR DISTRIBUTING INTERRUPTS IN A MULTI-PROCESSOR SYSTEM

(75) Inventors: Joseph A. Bailey, Austin; Norman M. Hack, Pflugerville, both of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/251,265

(22) Filed: Feb. 16, 1999

(51) Int. Cl.[7] ...................................................... G06F 13/24
(52) U.S. Cl. ............................ 710/260; 710/48; 710/264; 710/268
(58) Field of Search .................................. 710/260–269, 710/48, 131, 37

(56) References Cited

U.S. PATENT DOCUMENTS

| | | |
|---|---|---|
| 4,495,569 | 1/1985 | Kagawa . |
| 4,862,354 | 8/1989 | Fiacconi et al. . |
| 4,967,342 | 10/1990 | Lent et al. . |
| 5,125,093 * | 6/1992 | McFarland . |
| 5,218,703 | 6/1993 | Fleck et al. . |
| 5,283,904 * | 2/1994 | Carson et al. ........................ 710/266 |
| 5,675,807 * | 10/1997 | Iswandhi et al. ..................... 710/260 |
| 5,781,187 | 7/1998 | Gephardt et al. . |
| 6,041,377 * | 3/2000 | Mayer et al. .......................... 710/113 |

FOREIGN PATENT DOCUMENTS

94/08313    4/1994   (WO) .

* cited by examiner

*Primary Examiner*—Ario Etienne
(74) *Attorney, Agent, or Firm*—Conley Rose & Tayon, PC; B. Noël Kivlin

(57) ABSTRACT

An interrupt messaging scheme for a multiprocessing computer system where a dedicated bus to carry interrupt messages within the multiprocessing system is eliminated. Instead, an interconnect structure using a plurality of high-speed dual-unidirectional links to interconnect processing nodes, I/O devices or I/O bridges in the system is implemented. Interrupt messages are transferred as discrete binary packets over point-to-point unidirectional links. Various interrupt requests are transferred through a predetermined set of discrete interrupt message packets. Interrupt message initiators—an I/O interrupt controller or a local interrupt controller (in case of an inter-processor interrupt)—may be configured to generate appropriate interrupt message packets upon receiving an interrupt request. A suitable routing algorithm may be employed to route various interrupt messages within the system. Simultaneous transmission of interrupt messages from two or more interrupt controllers may be possible without any need for bus arbitration. Interrupt response is decoupled from corresponding interrupt message and the interrupt messaging protocol may be implemented independently of the physical properties of a system bus carrying interrupt packets. System flexibility in managing interrupts is thus improved.

27 Claims, 12 Drawing Sheets

| Byte # | Bit 7 | Bit 6 | Bit 5 | Bit 4 | Bit 3 | Bit 2 | Bit 1 | Bit 0 |
|---|---|---|---|---|---|---|---|---|
| 0 | X | X | X | TM | MT3 | MT2 | MT1 | MT0 |
| 1 | V7 | V6 | V5 | V4 | V3 | V2 | V1 | V0 |

| Byte # | Bit 7 | Bit 6 | Bit 5 | Bit 4 | Bit 3 | Bit 2 | Bit 1 | Bit 0 |
|---|---|---|---|---|---|---|---|---|
| 0 | X | X | X | X | MT3 | MT2 | MT1 | MT0 |
| 1 | X | X | X | X | X | X | X | X |

| Byte # | Bit 7 | Bit 6 | Bit 5 | Bit 4 | Bit 3 | Bit 2 | Bit 1 | Bit 0 |
|---|---|---|---|---|---|---|---|---|
| 0 | X | X | X | X | MT3 | MT2 | MT1 | MT0 |
| 1 | V7 | V6 | V5 | V4 | V3 | V2 | V1 | V0 |

| Byte # | Bit 7 | Bit 6 | Bit 5 | Bit 4 | Bit 3 | Bit 2 | Bit 1 | Bit 0 |
|---|---|---|---|---|---|---|---|---|
| 0 | X | X | X | F | MT3 | MT2 | MT1 | MT0 |
| 1 | ARBP 7 | ARBP 6 | ARBP 5 | ARBP 4 | ARBP 3 | ARBP 2 | ARBP 1 | ARBP 0 |

Fig. 7A

| Byte # | Bit 7 | Bit 6 | Bit 5 | Bit 4 | Bit 3 | Bit 2 | Bit 1 | Bit 0 |
|---|---|---|---|---|---|---|---|---|
| 0 | X | X | X | X | MT3 | MT2 | MT1 | MT0 |
| 1 | RD7 | RD6 | RD5 | RD4 | RD3 | RD2 | RD1 | RD0 |
| 2 | RD15 | RD14 | RD13 | RD12 | RD11 | RD10 | RD9 | RD8 |
| 3 | RD23 | RD22 | RD21 | RD20 | RD19 | RD18 | RD17 | RD16 |
| 4 | RD31 | RD30 | RD29 | RD28 | RD27 | RD26 | RD25 | RD24 |

Fig. 7B

| MT [3:0] | Message Type Field |
|---|---|
| 0000 | Fixed Message |
| 0001 | Lowest Priority Message |
| 0010 | SMI Message |
| 0011 | Remote Read Message |
| 0100 | NMI Message |
| 0101 | INIT Message |
| 0110 | Start Up message |
| 0111 | EXTINT Message |
| 1000 | EOI Message |
| 1001 | LP Arbitration Response |
| 1010 | Remote Read Response |

| TM | Trigger Mode |
|---|---|
| 0 | Edge-Triggered |
| 1 | Level-Triggered |

| F | Focus Processor |
|---|---|
| 0 | Not a Focus Processor |
| 1 | Focus Processor |

| Bit Time | 7 | 6 | 5 | 4 | 3 | 2 | 1 | 0 |
|---|---|---|---|---|---|---|---|---|
| 1 | TM | DM | CMD [5:0] | | | | | |
| 2 | MT [2:1] | | SrcNode [3:0] | | | | MT [0] | Rsv |
| 3 | IntrDest [7:0] | | | | | | | |
| 4 | Vector [7:0] | | | | | | | |

Fig. 10A

| Bit Time | 7 | 6 | 5 | 4 | 3 | 2 | 1 | 0 |
|---|---|---|---|---|---|---|---|---|
| 1 | TM | DM | CMD [5:0] | | | | | |
| 2 | MT [2:0] | | | PipeID [4:0] | | | | |
| 3 | IntrDest [7:0] | | | | | | | |
| 4 | Vector [7:0] | | | | | | | |

Fig. 10B

| MT [2:0] | Message Type Field |
|---|---|
| 000 | Fixed Message |
| 001 | Lowest Priority Message |
| 010 | SMI Message |
| 011 | NMI Message |
| 100 | INIT Message |
| 101 | Start Up Message |
| 110 | Ext INT Message |
| 111 | EOI Message |

| DM | Destination Mode |
|---|---|
| 0 | Physical |
| 1 | Logical |

| CMD [5:0] | Command | Packet Type |
|---|---|---|
| 000001 | Interrupt Broadcast | Command |
| 001101 | Interrupt Target | Command |
| 111110 | Interrupt Response | Response |

| Bit Time | 7 | 6 | 5 | 4 | 3 | 2 | 1 | 0 |
|---|---|---|---|---|---|---|---|---|
| 1 | TgtNode [1:0] | | CMD [5:0] | | | | | |
| 2 | Rsv | | SrcNode [3:0] | | | | TgtNode [3:2] | |
| 3 | TM | DM | MT [2:0] | | | Rsv | | |
| 4 | Vector [7:0] | | | | | | | |

Fig. 12

| Bit Time | 7 | 6 | 5 | 4 | 3 | 2 | 1 | 0 |
|---|---|---|---|---|---|---|---|---|
| 1 | TgtNode [1:0] | | CMD [5:0] | | | | | |
| 2 | Rsv | | RespNode [3:0] | | | | TgtNode [3:2] | |
| 3 | Rsv | | | | | | LpaInfo [1:0] | |
| 4 | Priority [7:0] | | | | | | | |

Fig. 13A

| LpaInfo | Low Priority Arbitration Information |
|---|---|
| x0 | This node was not targeted in the broadcast. |
| 01 | This node was targeted in the broadcast, but is not the focus processor. |
| 11 | This node was targeted in the broadcast and is declaring itself the focus processor. |

Fig. 13B

METHOD FOR DISTRIBUTING INTERRUPTS IN A MULTI-PROCESSOR SYSTEM

BACKGROUND OF THE INVENTION

1. Field of the Invention

The present invention relates to multiprocessing computer systems, and more particularly, to interrupt messaging within a multiprocessing computer system.

2. Description of the Related Art

Multiprocessing computer systems are characterized by having two or more processing units operating in parallel to effectively increase the throughput of the system. In a multiprocessing environment, tasks are divided into groups or "threads" that can be handled by separate processors. This is quite different from a single processor system, because the processing load is advantageously distributed among several processors, and the distributed tasks may be executed simultaneously in parallel. The operating system software may divide various portions of the program code into separately executable threads, and may also typically assign a priority level to each thread.

An important consideration with respect to a multiprocessing system is the handling and distribution of interrupts generated by various system resources. FIG. 1 shows a prior art arrangement to manage interrupts in a multiprocessing environment. In FIG. 1, three local interrupt controllers, 14A through 14C, are shown connected to their respective processors, 12A through 12C. An I/O subsystem 10 is shown as an initiator of interrupts that are directed to an I/O interrupt controller 16 through a set of interrupt lines 15. One of the devices constituting the I/O subsystem 10 may assert a respective interrupt signal on one of the interrupt lines 15. In response to that interrupt signal, the I/O interrupt controller 16 determines potential destinations for the interrupt signal and delivers that interrupt signal to one or more of the local interrupt controllers that are determined as interrupt destinations. The interrupt signal is delivered through an appropriate interrupt message that is transmitted on the dedicated interrupt bus 18. The interrupt message includes the bits to identify one or more of the interrupt destinations, and may also include an appropriate interrupt vector depending on the type of the interrupt being asserted by the I/O subsystem 10. For example, a lowest priority interrupt may generate a different interrupt message than a non-maskable interrupt.

The I/O subsystem may include an I/O device that asserts a respective interrupt signal based on the occurrence (or non-occurrence) of a particular event. As will be appreciated by those skilled in the art, interrupts are routinely generated by system resources such as keyboard devices, printers, timers etc. These devices may also comprise the I/O subsystem 10. Many systems also accommodate software interrupts whereby an interrupt may be asserted in response to software command. Additionally, in a multiprocessing computer system, one or more inter-processor interrupts may arise. In that case, the respective local interrupt controller transmits an appropriate interrupt message to one or more local interrupt controllers that are specified as potential destinations for the inter-processor interrupt.

Due to the number of different interrupts that may occur within a system, it is desirable to provide a mechanism to efficiently manage and distribute the interrupts to achieve optimal system performance and bus utilization. In the arrangement of FIG. 1, a dedicated wired-or bus is required to manage the interrupt traffic. The presence of such an additional dedicated bus may necessitate blending of the physical characteristics of the bus with the interrupt-management protocol to be implemented in the system. This, in turn, may make the interrupt-management protocol bus-dependent, thereby reducing the portability of the protocol when a different multiprocessor architecture is introduced. The wired-or architecture places a limitation on the number of local interrupt controllers a system can have, which, in turn, places a limitation on the number of processors that can be accommodated. This is due to the fact that a wired-or bus inherently suffers from signal degradation as loads are added and, in some cases, may necessitate slowing down of the bus frequency because of the bandwidth constraints.

The dedicated interrupt bus 18 is physically hooked to each interrupt controller as is depicted in FIG. 1. The width of the bus 18 may range from two to five bits. In any event, the serial nature of message transmission over the interrupt bus 18 requires many bit times to complete a single message. A "bit time" is the amount of time required to transmit one bit per line. When the interrupt bus 18 is an open drain bus, i.e. a bus connected to pull-up transistors to function as a wired-or bus, any interrupt controller—local or I/O—can pull the bus to a logic low state. This action by one interrupt controller may severely restrict a simultaneous transmission of anther interrupt message through the bus by a different interrupt controller. As the bus 18 is physically connected to each interrupt controller in the system, all interrupt controllers are able to track every message that is sent on the dedicated interrupt bus 18, thereby knowing when a message starts and when it ends. When this kind of arrangement is an integral part of the interrupt management protocol, only one interrupt message may be sent through the bus at a time. When multiple interrupt controllers try to transmit respective interrupt messages simultaneously, the wired-or nature of the bus and the bus-dependent interrupt-management protocol force the interrupt controllers to arbitrate in real time before sending the interrupt message on the bus. This may, in certain critical situations, not be desirable at all.

Bus arbitration normally takes place at the beginning of an interrupt message, thereby adding additional bit times for that particular message. Further, interrupt controllers that lose the arbitration priority must postpone their transmission of interrupt messages until the winner interrupt controller is taken care of by the system. Also, response to an interrupt message, e.g., accept, reject, retry, etc., takes place within the message itself. In fact, there is actually a bit time reserved within each interrupt message to allow destination interrupt controllers to indicate their response to the interrupt message, or even to drive a check_sum error response. In other words, the interrupt message is treated as a seamless event that is complete only when an indication of beginning of interrupt servicing is received by the interrupt controller that initiated the interrupt message on the dedicated bus 18. Thus, a different interrupt message cannot be transmitted on the dedicated bus 18 as long as there is a pending interrupt message occupying the bus bandwidth. This protocol, thus, results in less than optimal use of system resources.

Further, each interrupt controller, whether I/O or local, requires additional pins to allow its physical attachment to the dedicated bus 18. This increase in pin-count per interrupt controller is not at all balanced by a proportionate increase in performance throughput as discussed above. The existence of a dedicated interrupt bus 18, physical connection of each interrupt controller to that dedicated interrupt bus, and heavily bus-dependent nature of the interrupt management protocol create quite an inflexible multiprocessing architecture.

SUMMARY OF THE INVENTION

The foregoing briefly described the problems associated with a multiprocessing computer system architecture that employs a dedicated interrupt bus to carry interrupt messages and responses among different interrupt controllers. In one embodiment, the present invention contemplates a multiprocessing computer system without such a dedicated bus to carry the interrupt traffic. The multiprocessing computer system may comprise a plurality of processing nodes that are interconnected through an interconnect structure, preferably a first plurality of dual unidirectional links. Each unidirectional link in a dual unidirectional link connects only two of the processing nodes. One unidirectional link sends signals from a first processing node to a second processing node connected through the respective dual unidirectional link. The other unidirectional link in the pair carries a reverse flow of signals, i.e. it sends signals from the second processing node to the first processing node. Thus, each unidirectional link performs as a point-to-point interconnect that is designed for packetized information transfer. Communication between two processing nodes may be routed through more than one remaining processing nodes.

Each processing node comprises at least one processor core and may further include one or more local interrupt controllers coupled to the corresponding processor core in the processing node. Interface logic may be included in a processing node to allow connectivity with various I/O devices through one or more I/O bridges. One or more I/O bridges may be coupled to their respective processing nodes through a second plurality of dual unidirectional links. These I/O bridges, then, communicate with their host processors through this second plurality of unidirectional links in much the same way as the directly-linked processing nodes communicate with one another through the first plurality of dual unidirectional links.

In one embodiment, simultaneous transmission of interrupt messages from two or more different interrupt controllers is accomplished without any bus arbitration penalties. Each interrupt message is transmitted over the dual-unidirectional link structure as a discrete binary packet. The packetized interrupt messages maximize usage of system resources and increase system flexibility in managing interrupts. In one embodiment, an interrupt messaging protocol that does not depend on the physical characteristics of a bus is contemplated. The interrupt protocol may be implemented with any bus architecture, e.g. the point-to-point dual unidirectional link architecture. Further, elimination of a dedicated bus to carry interrupt messages reduces pin counts for interrupt controllers that may be employed in the multiprocessing system. In the absence of a wired-or interrupt bus, the speed of interrupt message transfer may be increased.

In a further embodiment of the interrupt messaging scheme, local and I/O interrupt controllers in the multiprocessing system transfer various interrupt requests, e.g., a lowest-priority interrupt, a fixed priority interrupt, a system management interrupt, a remote read interrupt, etc., through a predetermined set of interrupt message packets. Various fields in an interrupt message packet may identify the type of the interrupt request being conveyed through the interrupt message packet, the trigger mode for the interrupt, the vector associated with the interrupt, etc. Some interrupt messages, e.g., a lowest priority interrupt message or a remote read interrupt message, may require a corresponding response from the recipient local interrupt controller. Two predetermined interrupt response packet formats—one for the lowest priority arbitration response and the other for a remote read response—have also been disclosed.

In another embodiment, an interrupt messaging scheme to transfer interrupt packets (with additional routing and destination information) among processing nodes and I/O bridge in the multiprocessing computer system is disclosed. A lowest priority interrupt message packet from an I/O bridge is transmitted over a unidirectional link from the second plurality of unidirectional links. The host processing node that is immediately connected to the I/O bridge receives the interrupt message packet and converts it into a different format. The host node, then, broadcasts the converted interrupt message packet to all the remaining processing nodes in the system regardless of whether a processing node is identified as a target in the interrupt message packet from the I/O bridge. The broadcast of the converted lowest priority interrupt message packet is carried out over the links from the first plurality of dual unidirectional links.

Each processing node in the system responds with an interrupt response packet. The local interrupt controller within the host processing node identifies the processing node claiming a focus processor or, in the absence of such a focus processor, the processor having the lowest arbitration priority. The host node finally sends a fixed priority interrupt message targeted to the processing node that is selected to receive the lowest priority interrupt. In an alternative embodiment, the I/O interrupt controller may, instead, identify the processing node claiming a focus processor or, in the absence of such a focus processor, the processing node having the lowest arbitration priority. The I/O interrupt controller may, then, send the fixed priority message (via the host processing node) to the processing node that is selected to receive the lowest priority interrupt.

A similar broadcast operation is also performed in case of a fixed priority interrupt, an ExtINT interrupt and a non-vectored interrupt (e.g., an SMI interrupt, an NMI interrupt, etc.). However, according to the interrupt protocol, the host node here does not convert the interrupt message packet received from the I/O bridge. Instead, the interrupt packet is simply forwarded to all other nodes in the system. In one embodiment, the nodes that identify themselves as targets of these interrupt messages may simply process the interrupts without sending a response to the host node because of storage availability for guaranteed acceptance of each interrupt. Other non-targeted nodes may simply ignore the received interrupt messages. Since certain interrupt responses need not be transmitted, the interrupt protocol may help conserve the system bus bandwidth and eliminate delays involved in waiting for interrupt responses.

Various interrupt message packets and the lowest priority interrupt response packet may include source and destination information to facilitate routing of interrupt packets within the system. A local interrupt controller receiving an interrupt packet may determine therefrom such information as whether it is the target of the interrupt request, which destination node the interrupt response is required to be sent to, what is the interrupt vector associated with the interrupt message, etc.

System flexibility in managing interrupts may be improved when an interrupt response is decoupled from the corresponding interrupt message. In one embodiment, each local interrupt controller in the system is provided with a storage for 240 vectored interrupts (for an 8-bit interrupt vector configuration). Hence, no interrupt may be rejected in the multiprocessing system, thereby eliminating the need for accept/retry messages. Elimination of a wired-or dedicated interrupt bus, implementation of bus-independent interrupt messaging protocol, transfer of packetized interrupt messages, allowance of simultaneous transfer of interrupt messages from two or more processing nodes, and reduction in interrupt packet traffic may significantly improve interrupt management within a multiprocessing system.

BRIEF DESCRIPTION OF THE DRAWINGS

A better understanding of the present invention can be obtained when the following detailed description of the preferred embodiment is considered in conjunction with the following drawings, in which:

FIGS. 6A–6C show one embodiment of various interrupt message packets.

FIG. 7A shows one embodiment of a lowest priority arbitration response packet.

FIG. 7B depicts one embodiment of a remote read response packet.

FIGS. 8A–8C show in detail an exemplary encoding for certain binary fields used in the interrupt message and interrupt response packets in FIGS. 6A–6C and FIGS. 7A–7B.

FIG. 10A shows one embodiment of an interrupt broadcast packet for a coherent link.

FIG. 10B is one embodiment of an interrupt broadcast packet for a non-coherent link.

FIGS. 11A–11C respectively show an exemplary encoding for the message type field, the destination mode bit and the CMD field.

FIG. 12 depicts one embodiment of a directed interrupt packet over a coherent link FIG. 13A shows one embodiment of a lowest priority arbitration response packet.

FIG. 13B depicts an exemplary encoding for the LpaInfo field in the lowest priority arbitration response packet of FIG. 13A.

DETAILED DESCRIPTION OF THE PREFERRED EMBODIMENT

Figure 2:
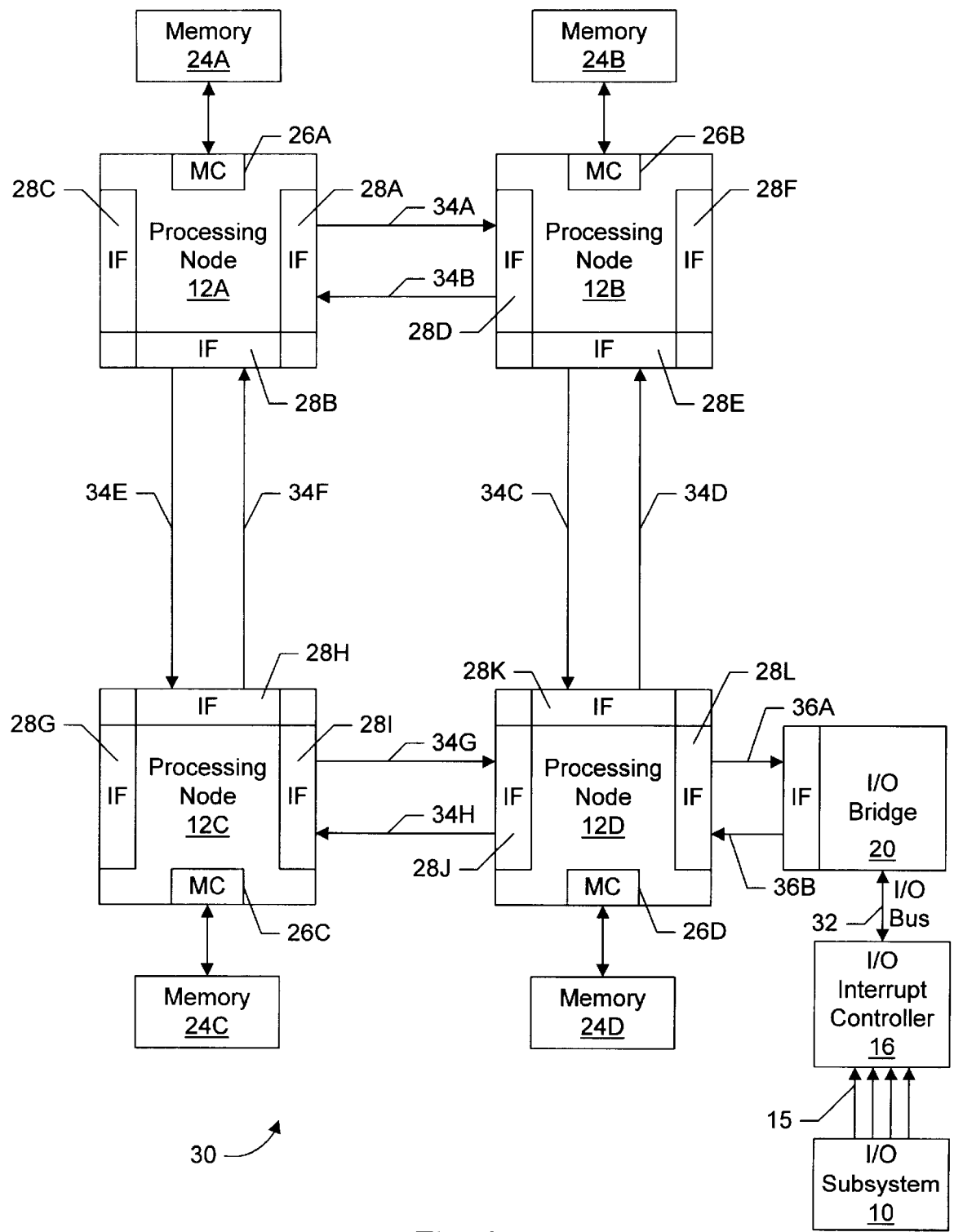
FIG. 2 is a block diagram of one embodiment of a multiprocessing computer system with a discrete I/O interrupt controller.

Turning now to FIG. 2, one embodiment of a multiprocessing computer system 30 is shown. In the embodiment of FIG. 2, computer system 30 includes several processing nodes 12A, 12B, 12C, and 12D. Each processing node is coupled to a respective memory 24A–24D via a memory controller 26A–26D included within each respective processing node 12A–12D. Additionally, processing nodes 12A–12D include one or more interface ports 28, also known as interface logic, to communicate among the processing nodes 12A–12D, and to also communicate between a processing node and a corresponding I/O bridge. For example, processing node 12A includes interface logic 28A for communicating with processing node 12B, interface logic 28B for communicating with processing node 12C, and a third interface logic 28C for communicating with yet another processing node (not shown). Similarly, processing node 12B includes interface logic 28D, 28E, and 28F; processing node 12C includes interface logic 28G, 28H, and 28I; and processing node 12D includes interface logic 28J, 28K, and 28L. Processing node 12D is coupled to communicate with an I/O bridge 20 via interface logic 28L. Other processing nodes may communicate with other I/O bridges in a similar fashion. I/O bridge 20 is coupled to the I/O interrupt controller 16 via an I/O bus 32.

Figure 1:
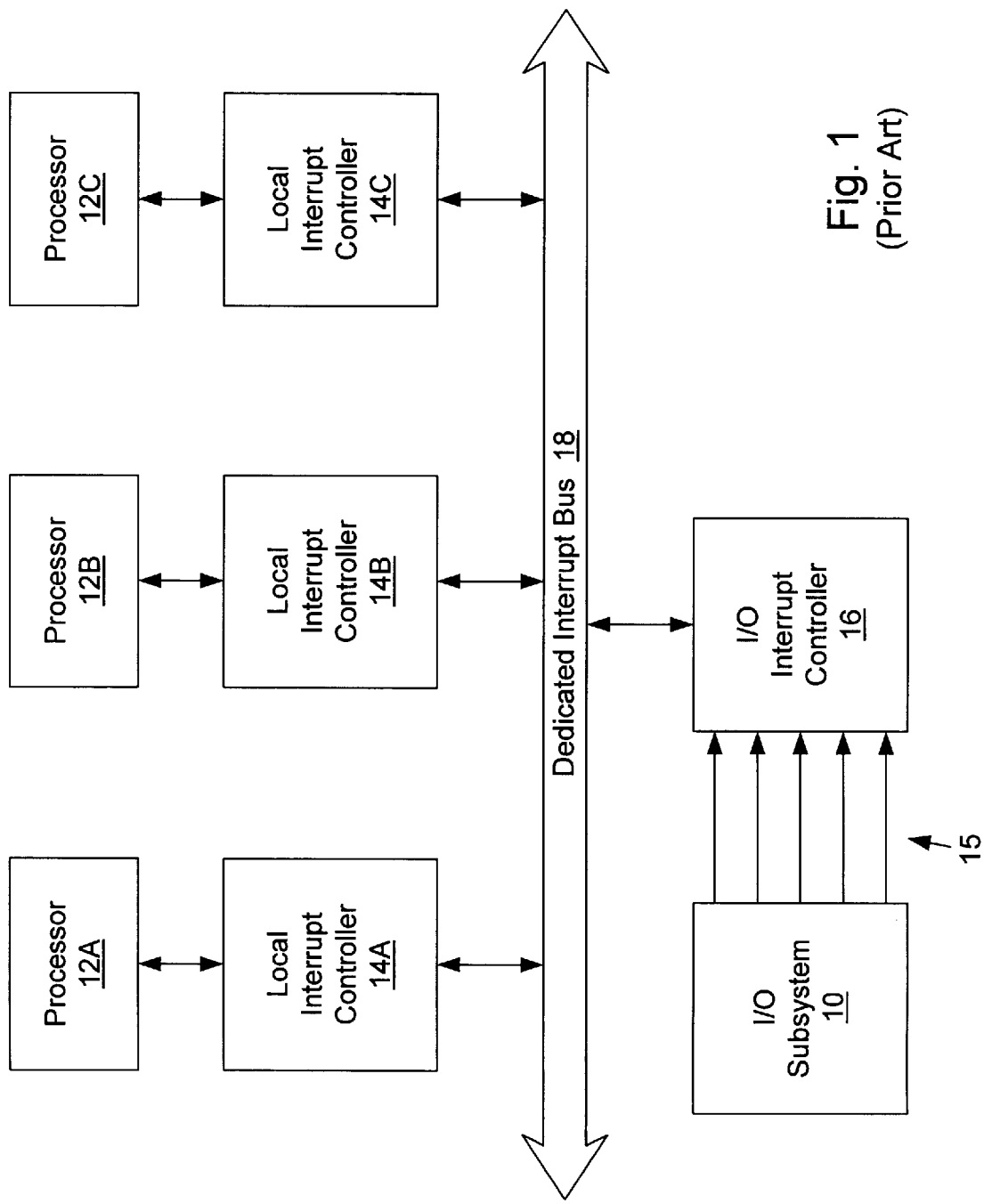
FIG. 1 shows a prior art arrangement to manage interrupts in a multiprocessing computer system.

The I/O bus 32 is a bidirectional bus that carries interrupt messages from the I/O interrupt controller 16 to the I/O bridge 20 and vice versa. The I/O bridge 20 transmits appropriate interrupt command to the host processing node 12D and receives any interrupt message or response, e.g. an EOI (end of interrupt) message, from the host processing node that is to be transmitted to the I/O interrupt controller as described in detail later. The I/O subsystem 10 is shown connected to the I/O interrupt controller 16 through a set of interrupt lines 15. A similar arrangement is also shown in FIG. 1. I/O subsystem 10 may include various interrupt generating mechanisms and sources including, for example, a keyboard, a printer, a timer etc. Other I/O devices that generate software or hardware interrupts in the system may also be included as part of the I/O subsystem as described earlier. More than one I/O device may transmit an interrupt request over a corresponding interrupt line 15. The I/O interrupt controller 16 may queue interrupt requests based on their priorities or based on any other predetermined interrupt message transfer algorithm.

Figure 3:
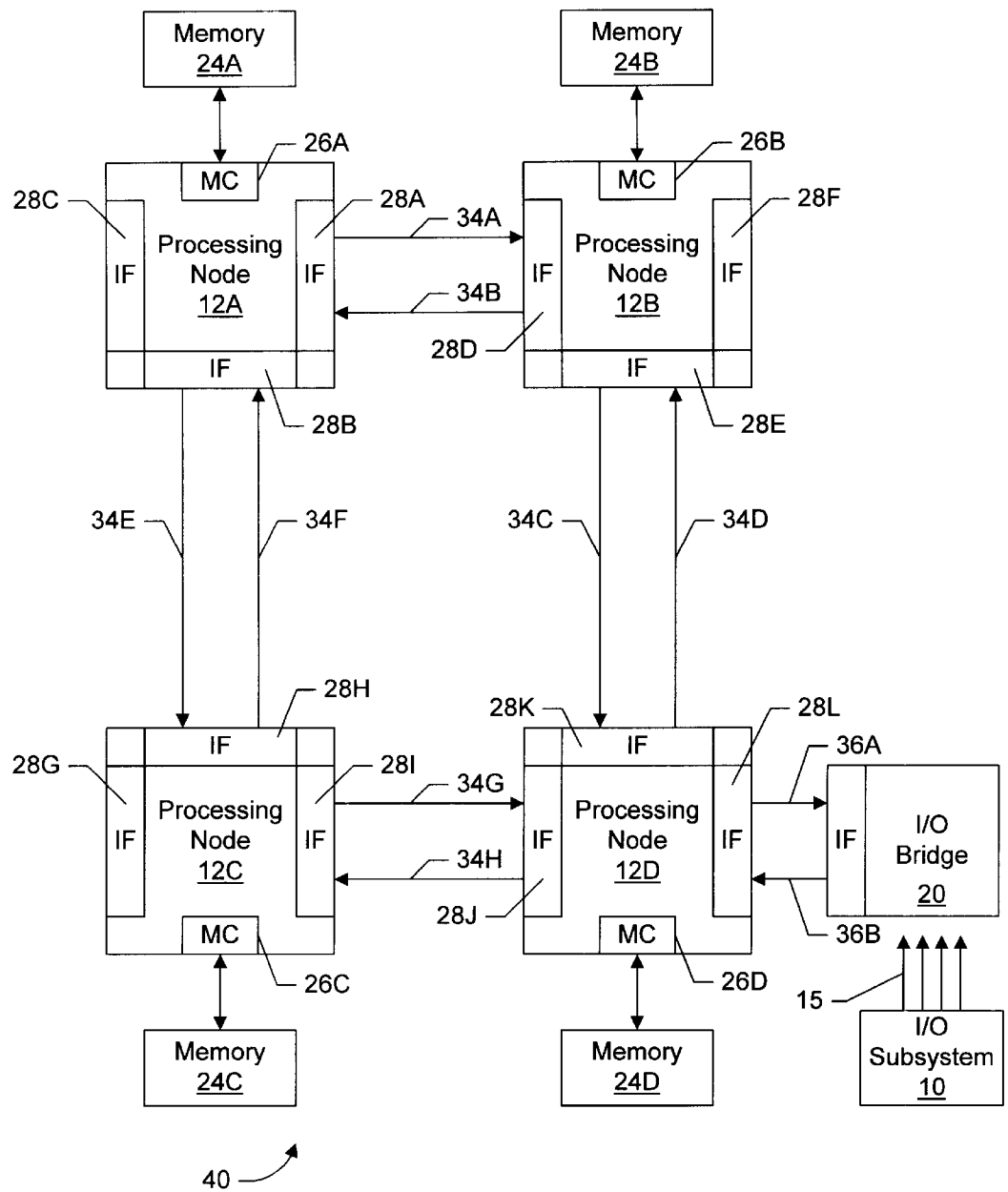
FIG. 3 is similar to FIG. 2 except that the I/O interrupt controller is included as part of the I/O bridge design.

The multiprocessing computer system 40 in FIG. 3 is similar to the system 30 shown in FIG. 2, but with one exception. The I/O interrupt controller 16 in FIG. 2 is shown to be an external discrete device that is coupled to the I/O bridge 20. In the embodiment of FIG. 3, however, the I/O bridge 20 includes the I/O interrupt controller 16 (as shown in detail in FIG. 5). Thus, in the embodiment of FIG. 3, the I/O bridge 20 directly receives interrupt requests from corresponding I/O devices constituting the I/O subsystem 10. These interrupt requests are first converted into appropriate interrupt messages by the internal (or external, as in FIG. 2) I/O interrupt controller. The I/O bridge 20 generates appropriate interrupt broadcast packets from the interrupt messages and transmits them to the host processing node 12D over a non-coherent unidirectional link 36B as described later. Any response or message from the host processing node 12D is transmitted to the I/O bridge 20 through another non-coherent unidirectional link 36A.

It is to be understood that the I/O bridge 20 is shown connected to the host processing node 12D for illustrative purpose only. Other processing nodes may function as host processing nodes, and many more I/O bridges may be included in the multiprocessing system, 30 or 40, as desired. Additionally, more than four processing nodes may be included in the system. For example, in the event that the local interrupt controllers 14 (FIG. 1) are identified through an 8-bit ID, the multiprocessing computer system, 30 or 40, may include up to 255 processing nodes; the ID with all binary 1's may be reserved for a broadcast-to-all message. The multiprocessing nodes may be organized in a number of clusters (not shown) with each cluster having, for example, four processing nodes. Two or more clusters may be connected via a hub (not shown). Appropriate routing algorithm may be employed to transfer binary packets between two processing nodes in two different clusters.

The discussion henceforth refers to the embodiment in FIG. 3, but the discussion equally applies to the multiprocessing system 30 of FIG. 2 as well. The interface structure that interconnects processing nodes 12A–12D includes a set of dual-unidirectional links. Each dual-unidirectional link is implemented as a pair of packet-based unidirectional links to accomplish high-speed packetized information transfer between any two processing nodes in the computer system 40. Each unidirectional link may be viewed as a pipelined, split-transaction interconnect. Each unidirectional link 34 includes a set of coherent unidirectional lines. Thus, each pair of unidirectional links may be viewed as comprising one transmission bus carrying a first plurality of binary packets and one receiver bus carrying a second plurality of binary packets. The content of a binary packet will primarily depend on the type of operation being requested and the processing node initiating the operation. One example of a dual-unidirectional link structure is links 34A and 34B. The unidirectional lines 34A are used to transmit packets from processing node 12A to processing node 12B and lines 34B are used to transmit packets from processing node 12B to processing node 12A. Other sets of lines 34C–34H are used to transmit packets between their corresponding processing nodes as illustrated in FIG. 3.

A similar dual-unidirectional link structure may be used to interconnect a processing node and its corresponding I/O device, or a graphic device or an I/O bridge as is shown in FIG. 3 (links 36A and 36B) with respect to the host processing node 12D. A dual-unidirectional link may be operated in a cache coherent fashion for communication between processing nodes or in a non-coherent fashion for communication between a processing node and an external I/O or graphic device or an I/O bridge. More than one non-coherent dual-unidirectional link may be present in a multiprocessing computer system depending on the number of I/O bridges or I/O devices that are directly connected to their respective host processing nodes. It is noted that a packet to be transmitted from one processing node to another may pass through one or more remaining nodes. For example, a packet transmitted by processing node 12A to processing node 12D may pass through either processing node 12B or processing node 12C in the arrangement of FIG. 3. Any suitable routing algorithm may be used. Other embodiments of computer system 40 may include more or fewer processing nodes than those shown in FIG. 4, and may also include unidirectional links (coherent and non-coherent) in different circuit topologies than the ones shown in FIGS. 3 and 4.

Processing nodes 12A–12D, in addition to a memory controller and interface logic, may include other circuit elements such as a local interrupt controller, one or more processor cores, an internal cache memory, a bus bridge, a graphics logic, a bus controller, a peripheral device controller, etc. Broadly speaking, a processing node in FIG. 3 comprises at least one processor and a corresponding local interrupt controller for each processor core (see FIG. 5). The processing node may optionally include a memory controller for communicating with a memory and other logic as desired. Further, each circuit element in a processing node may be coupled to one or more interface ports depending on the functionality being performed by the processing node. For example, some circuit elements may only couple to the interface logic that connects an I/O bridge to the processing node, some other circuit elements may only couple to the interface logic that connects two processing nodes, etc. Other combinations may be easily implemented as desired.

Memories 24A–24D may comprise any suitable memory devices. For example, a memory 24A–24D may comprise one or more RAMBUS DRAMs (RDRAMs), synchronous DRAMs (SDRAMs), static RAM, etc. The memory address space of the computer system 40 is divided among memories 24A–24D. Each processing node 12A–12D may include a memory map used to determine which addresses are mapped to which memories 24A–24D, and hence to which processing node 12A–12D a memory request for a particular address should be routed. In one embodiment, the coherency point for an address within computer system 40 is the memory controller 26A–26D coupled to the memory that is storing the bytes corresponding to the address. In other words, the memory controller 26A–26D is responsible for ensuring that each memory access to the corresponding memory 24A–24D occurs in a cache coherent fashion. Memory controllers 26A–26D may comprise control circuitry for interfacing to memories 24A–24D. Additionally, memory controllers 26A–26D may include request queues for queuing memory requests.

Generally, interface logic 28A–28L may comprise a variety of buffers for receiving packets from one unidirectional link and for buffering packets to be transmitted upon another unidirectional link. Computer system 40 may employ any suitable flow control mechanism for transmitting packets. For example, in one embodiment, each transmitting interface logic 28 stores a count of the number of each type of buffers within the receiving interface logic at the other end of the link to which the transmitting interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

Figure 4:
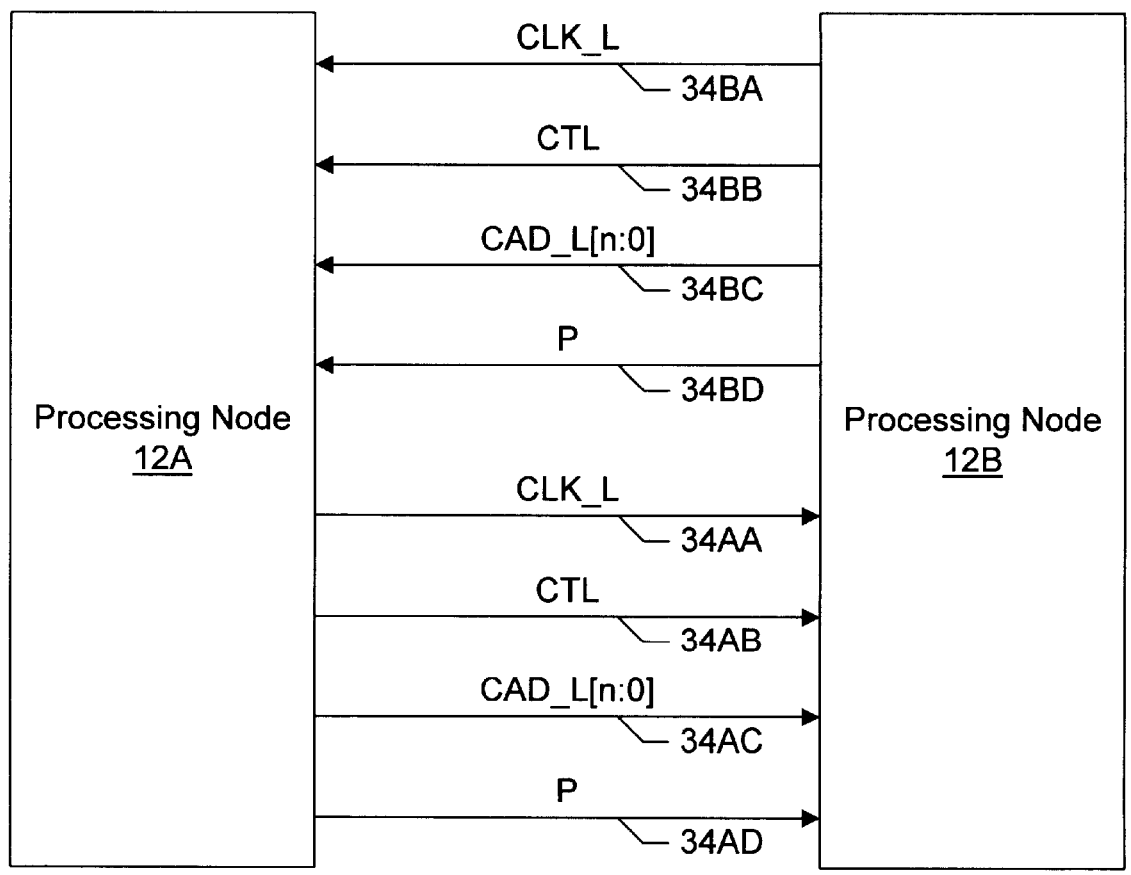
FIG. 4 shows in detail one embodiment of the interconnect between a pair of processing nodes from FIGS. 2 and 3.

Turning next to FIG. 4, a block diagram illustrating processing nodes 12A and 12B is shown to illustrate in more detail one embodiment of the dual unidirectional link structure connecting the processing nodes 12A and 12B. In the embodiment of FIG. 4, lines 34A (the unidirectional link 34A) include a clock line 34AA, a control line 34AB, a command/address/data bus 34AC, and a parity line 34AD. Similarly, lines 34B (the unidirectional link 34B) include a clock line 34BA, a control line 34BB, a command/address/data bus 34BC, and a parity line 34BD. Although FIG. 4 illustrates component lines that constitute a coherent dual-unidirectional link, it is noted that the non-coherent dual-unidirectional link 36A–36B also comprises the same component lines. The distinction between a non-coherent and a coherent dual-unidirectional link is made to emphasize the different packets that are transmitted or received over the non-coherent and coherent links. The two types of links may have functional differences, but physically both types of links constitute the same set of lines, i.e. the control lines, the parity lines, the clock lines and the command/address/data buses.

A clock line transmits a clock signal that indicates a sample point for its corresponding control line and the command/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the command/address/data bus. For example, two clock lines may be used for a 32-bit command/address/data bus (with one half of the command/address/data bus referenced to one of the clock lines and the other half of the command/address/data bus and the control line referenced to the other one of the clock lines.

The control line indicates whether or not the data transmitted upon the command/address/data bus is either a bit time of a control packet or a bit time of a data packet. The control line is asserted to indicate a control packet, and deasserted to indicate a data packet. Certain control packets indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. Control packets that interrupt a data packet may not indicate that a data packet will be following.

The command/address/data bus comprises a set of lines for transmitting the data, command, responses and address bits. In one embodiment, the command/address/data bus may comprise 8, 16, or 32 lines. Each processing node or I/O bridge may employ any one of the supported numbers of lines according to design choice. Other embodiments may support other sizes of command/address/data bus as desired.

The parity line is used to transmit parity covering the command/address/data bus and the control line. For example, even parity may be used.

According to one embodiment, the command/address/data bus lines and the clock line may carry inverted data (i.e. a logical one is represented as a low voltage on the line, and a logical zero is represented as a high voltage). Alternatively, these lines may carry non-inverted data (in which a logical one is represented as a high voltage on the line, and logical zero is represented as a low voltage). A suitable positive and negative logic combination may also be implemented.

Figure 5:
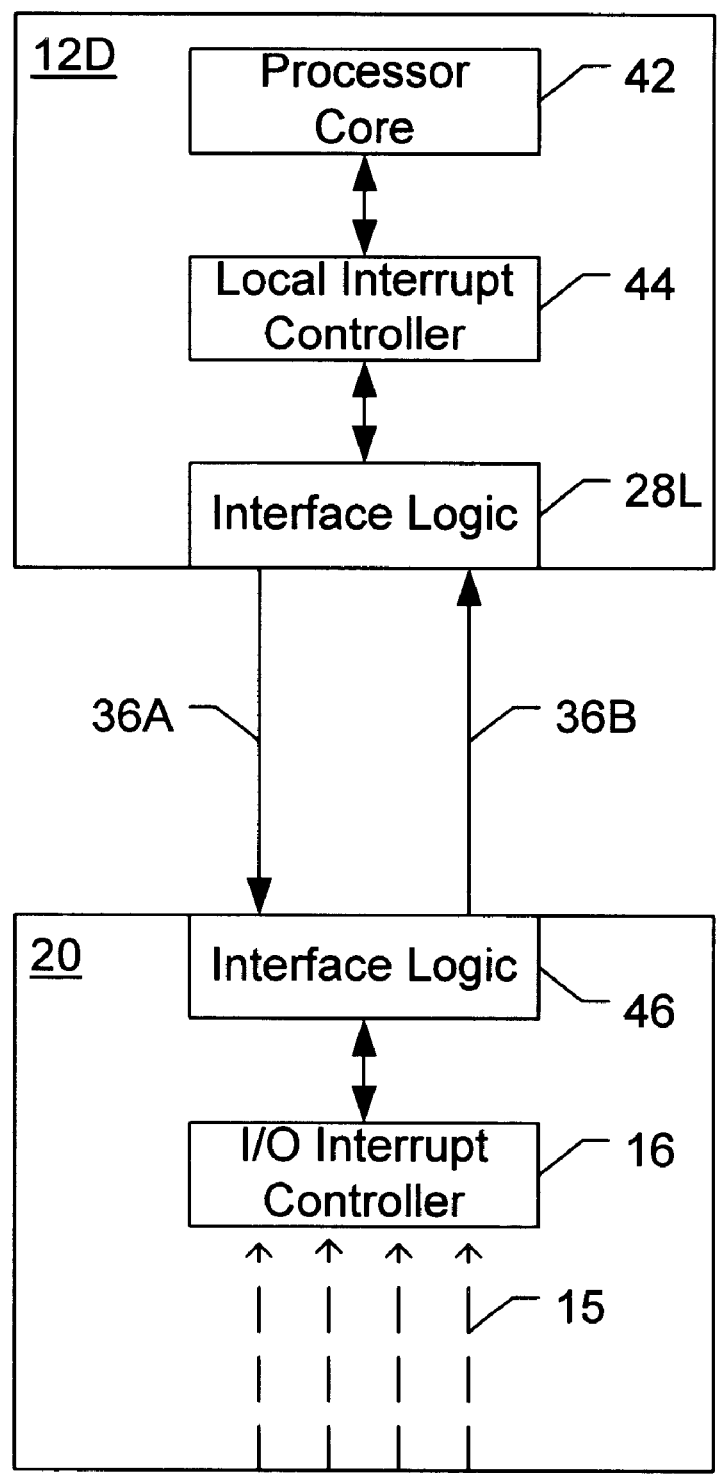
FIG. 5 depicts interconnection between the I/O bridge and its corresponding host processing node.

Referring now to FIG. 5, the interconnection between the host processing node 12D and the I/O bridge 20 in FIG. 3 is shown in detail. The I/O bridge 20 has an internal, built-in I/O interrupt controller 16 that receives interrupt requests from the I/O subsystem as shown by the dotted arrows 15. The I/O interrupt controller 16 may be bidirectionally coupled to an interface logic 46. The host processing node 12D includes a processor core 42, a local interrupt controller 44 corresponding to that processor core 42, and the interface logic 28L that connects the host processing node 12D to the I/O bridge 20 via the interface logic 46 in the I/O bridge 20. It was mentioned earlier that the host processing node may have more than one processor cores, and may, hence, include more than one corresponding local interrupt controllers. The interrupt controllers (local as well as I/O) may be fabricated on a single silicon substrate together with their corresponding processor cores or I/O bridge designs. As the dedicated interrupt bus is not needed in the multiprocessing system configurations in FIGS. 2 and 3, each interrupt controller (local or I/O) may not need to have additional lines connecting the respective interrupt controller to the dedicated interrupt bus.

As previously mentioned, a non-coherent link, e.g. link 36A or 36B, may be used to connect a processing node to an I/O bridge or an I/O or graphics device. The I/O bridge may further connect to other I/O devices or I/O bridges. Hence, in the configuration of FIG. 3, the I/O bridge 20 may not only connect to the I/O subsystem 10, but may also connect to other similar I/O bridges via other interface ports within the I/O bridge 20. The I/O subsystem 10 may connect to the I/O bridge 20 via an internal interface port (not shown) within the I/O bridge 20. Thus, the non-coherent link 36B may typically carry interrupt requests from more than one interrupt requesting devices depending on the circuit configuration. A message initiator or interrupt requesting device, e.g. an I/O device, a graphics device or a different I/O bridge, may be recognized as a "function." Generally, a "function" is a logical entity within a processing node that may act as a source or a destination of transactions. Functions are useful for describing the transaction ordering rules for the multiprocessing system in FIGS. 2 or 3, especially when interrupt requests may be received from more than one initiator through a non-coherent link.

A "pipe" may be defined as a logical construct that carries transactions across a unidirectional link from a source to a target. Pipes connect functions and have properties of ordering and priority. Pipes allow reference streams from different functions to be combined onto a single unidirectional link, e.g. the link 36B, without losing information about the origin of the streams. Thus, even though a transaction may be viewed as flowing in one direction—from source to target, the packets required to execute the transaction may flow in both directions with proper pipe identifications. (The PipeID field in FIG. 10B is an example.) In short, the non-coherent links are distinguished from the coherent links because of the nature of packets carried over the non-coherent links. A coherent link carries packet from only one initiator, i.e. the processing node originating the packet, even though there may be more than one local interrupt controllers within the initiator processing node. A non-coherent dual-unidirectional link, however, may carry packets from more than one initiators connected to the I/O bridge 20 via more than one interrupt line 15. Various packets may be transmitted over a non-coherent link, e.g. over the link 36B, and another non-coherent link, e.g. link 36A, may carry responses destined to more than one destinations connected to the I/O bridge 20 via the I/O subsystem 10.

FIGS. 6A–6C depict some exemplary interrupt message packets employed in one embodiment of the multiprocessing computer system of FIG. 2 or 3. An interrupt message packet may be generated by an interrupt controller upon receiving an interrupt request from an interrupt initiator. In FIG. 3, the interrupt request is shown to come from one or more of the I/O devices constituting the I/O subsystem 10. It is understood that an inter-processor interrupt may have a processing node as an interrupt request initiator. Each interrupt request is first received by the corresponding interrupt controller (local or I/O) that identifies the nature of the interrupt and generates an appropriate interrupt message based on the interrupt request. The following discussion assumes that the interrupt request initiator is the I/O subsystem 10, the interrupt message initiator is the I/O interrupt controller 16 and the interrupt message recipient is one or more of the local interrupt controllers at corresponding processing nodes. Generally, any of the local interrupt controllers may be interrupt message initiators, for example, during inter-processor interrupts. In that case, one or more of the remaining local interrupt controllers would be interrupt message recipients. Except for certain interrupt messages (e.g. an EOI message) an I/O interrupt controller generally may not be an interrupt message recipient.

FIG. 6A shows an exemplary interrupt message 50 that may be used in case of a fixed interrupt message, a lowest priority (LP) interrupt message, a remote read interrupt message or an ExtINT message. Generally, an ExtINT message may originate from an I/O interrupt controller only.

In one embodiment, the response (from appropriate interrupt message recipient) is required for a lowest priority interrupt message and a remote read interrupt message only. The vector information (bits V0–V7) contained in the ExtINT message is thrown away by the local interrupt controller that is the interrupt message recipient, and the corresponding processor core generates an interrupt acknowledge cycle on its external pins. The interrupt acknowledge cycle is generated to retrieve the interrupt vector from the interrupt message initiator, i.e. the I/O interrupt controller. However, no response message is sent to the I/O interrupt controller 16.

With the exception of the Remote Read message, the messages conveyed by the interrupt message packet in FIG. 6A are vectored interrupt messages as indicated by the vector field [bits V0–V7]. Remote Read message is always directed to a single local interrupt controller. Remote Read message may be generated by a local or an I/O interrupt controller to remotely read the value of one of the registers in the target local interrupt controller. The register is selected by providing its address in the vector field. The responding remote interrupt controller sends an independent remote read response packet along with the requested data. The data containing the requested register value may be latched by the initiator local interrupt controller and stored in its Remote Read register where it can be read by the corresponding local processor core. A Remote Read Response packet 62 is shown in FIG. 7B. The packet in FIG. 7B is an example of a Remote Read Response packet where the value requested from the remote register is of 32-bit length [the RD0–RD31 bits].

Referring now to FIG. 8A, a sample encoding 70 for the message type field (MT [3:0]) is shown. Each interrupt message (FIGS. 6A–6C) and each interrupt response (FIGS. 7A–7B) packet have a four bit field identified as MT [3:0]. This is referred to as the Message Type field. The Message Type field identifies the interrupt packet in the system and helps recipient local interrupt controllers to properly process the interrupt request and route the interrupt response to appropriate destination interrupt controllers.

Due to the point-to-point interconnect in FIG. 3, it may be possible that the reception of an interrupt response packet from one processing node to another may not follow the same path as the transmission of the corresponding interrupt message packet. Other source and destination information may be added to the interrupt packets in FIGS. 6A–6C and 7A–7B to accomplish non-serial transmission and reception of interrupt packets, as explained later with respect to FIGS. 10A, 10B, 12 and 13A. This packetization of interrupt messages and interrupt responses facilitates simultaneous transmission of interrupts within the system 40, regardless of the routing involved. Packetization also accomplishes decoupling of interrupt response from the corresponding interrupt message. Thus, link utilization may be optimized and more parallelism in interrupt management may be achieved by segregation of interrupt message and its corresponding response.

Referring back to FIG. 6A, the interrupt message packet 50 may be used to convey a lowest priority interrupt request. As previously described with reference to FIG. 1, the dedicated interrupt bus architecture requires bus arbitration in case where two or more interrupt controllers wish to transmit an interrupt message over the dedicated interrupt bus 18. Each local interrupt controller may be assigned a unique arbitration ID to resolve an arbitration conflict. The local interrupt controller with the highest arbitration ID may be the winner of bus arbitration. The arbitration ID may be the same as interrupt controller ID, or may be suitably derived from any relevant identification data. Additionally, the arbitration ID may be used to break a tie in the case of a lowest priority arbitration response that indicates presence of more than one processing cores with identical same lowest priority value.

In the present embodiment, the arbitration ID field may be discarded as the dedicated, wired-or interrupt bus 18 is no longer present. Due to decoupling of interrupt messages and interrupt responses, and due to availability of simultaneous transfers of interrupt packets in the system 40, there is no need for bus arbitration. Any interrupt controller in the multiprocessing system 40 that wishes to transmit an interrupt message or an interrupt response will have to queue its request up with all other requests emanating from the same processing node or the same I/O bridge, as the case may be. The point-to-point link architecture may be configured to determine which processing node or the I/O bridge may transmit a message over the respective link at any given instance. An interrupt message or an interrupt response packet may be just one type of messages being carried over the dual-unidirectional link structure. Link arbitration may not be required in view of the "coupon-based" packet transmission approach. Hence, arbitration ID field may not be needed as a conflict for link ownership may not arise.

As described before, the arbitration ID field was used in the multiprocessing system of FIG. 1 to break a tie in the case of two or more processing cores returning the same lowest priority value in response to a lowest priority interrupt message. An arbitration priority is a value calculated from the processor task priority and from the current highest priority "in service" or "pending" interrupt. It is only when the arbitration priority fails to find a single winner that the arbitration ID is used to break the tie that could occur between two or more local interrupt controllers. As the arbitration ID values are not tied to anything specific other than that the arbitration ID values must be unique, the selection of a lowest priority processor core to receive the interrupt based on the arbitration ID as a tie breaker is no better than just randomly picking one of the lowest priority processor cores. Each processor having the same lowest priority is equally suitable to receive the lowest priority interrupt. Hence, a random pick of the service processor accomplishes the same task without relying on the arbitration ID values. The elimination of arbitration ID field from the interrupt message packet 50 and from the lowest priority arbitration response packet 60 helps shorten the packet size.

In the multiprocessing system of FIG. 1, a special message may be required to be sent to all the local interrupt controllers to copy the interrupt controller ID values into corresponding arbitration ID fields. This may be necessary because during system reset each local interrupt controller may be assigned the same value for the arbitration ID field. Hence, upon system initialization, the uniqueness of arbitration ID values may not be maintained. In the present embodiment the arbitration ID field has been eliminated, and therefore there is no need to send any special message to each local interrupt controller. This further reduces number of messages within the multiprocessing systems 40 and 30 without sacrificing the scope of interrupt management protocol.

The TM (trigger mode) field takes one of the two possible values as shown in the table 72 in FIG. 8B. In one embodiment, a "0" value may indicate a level-triggered interrupt and a "1" value may indicate an edge-triggered interrupt. The local interrupt controller that receives a level-triggered interrupt generates an EOI (End of Interrupt)

message 54 (FIG. 6C). In one embodiment of interrupt messaging protocol, the TM bit may indicate an edge-triggered interrupt only, especially when the special message to load arbitration ID values is absent. The system may treat a level-triggered interrupt similarly as an edge-triggered interrupt, i.e. edge or level interrupts may not be distinguished by the interrupt management protocol and may both be treated as edge interrupts by local interrupt controllers.

In one embodiment, the local and I/O interrupt controllers may be built with the capability to determine the target of an interrupt message from the received interrupt request from the corresponding processor cores or the I/O bridge respectively. An interrupt controller may be built without the additional pins that were required in the dedicated interrupt bus architecture in FIG. 1. The interrupt messages and interrupt responses in FIGS. 6A–6C and in FIGS. 7A–7B respectively do not include any destination fields. In one embodiment, the corresponding processing nodes or the I/O bridge may be configured to incorporate interrupt routing details into an interrupt packet as is explained later with reference to FIGS. 10A, 10B, 12 and 13A.

In another embodiment, a broadcast interrupt message may be sent individually to each recipient interrupt controller. In an alternative embodiment, the initiator interrupt controller may send the broadcast interrupt message only to one or more processing nodes that are immediately connected to the host processing node. These first level of recipient nodes then replicate the broadcast message and propagate it to a second level of processing nodes (from the remaining nodes) that are immediately connected to the first level of recipient nodes, and so on until each recipient node receives a copy of the broadcast message. In an embodiment of an interrupt messaging protocol that is implemented independently of the physical characteristics of a dedicated interrupt bus, the interrupt messaging protocol may treat each local interrupt controller as a target of an interrupt message when the interrupt message is directed to that local interrupt controller. In the alternative, the interrupt protocol may configure the host processing node to route an interrupt message to each remaining local interrupt controller in the system irrespective of the status, i.e. target or not a target, of the recipient local interrupt controller. An example of such a scheme is discussed later with reference to FIG. 9A.

Referring now to FIG. 6B, an example 52 of an interrupt message that may be generated by an interrupt controller for a system management interrupt (SMI interrupt), a non-maskable interrupt (an NMI interrupt), a startup interrupt or an initialization interrupt (INIT interrupt). The appropriate message type field [MT field] identifies the interrupt message as shown by way of an example in FIG. 8A. The interrupts represented by the interrupt message 52 are not vectored interrupts. Hence, the vector field [V0–V7] is absent. Additionally, no response is required for these interrupts and these interrupts may not be rejected by the target local interrupt controller. FIG. 6C shows an embodiment of an EOI (end of interrupt) interrupt message packet 54. Generally, an EOI message 54 is transmitted by the target local interrupt controller in response to a level-triggered interrupt. Thus, the target local interrupt controller will transmit an EOI message packet 54 to the I/O interrupt controller or to other local interrupt controller who is the initiator of the interrupt message with the TM bit "1" (according to FIG. 8B) to indicate a level-triggered mode. The interrupt message initiator (I/O or local interrupt controller) will wait for the EOI message 54 if it sent a level-triggered interrupt. In one embodiment, the EOI message may be eliminated if each interrupt is treated as an edge-triggered interrupt.

As mentioned earlier, in one embodiment of the interrupt messaging protocol the I/O interrupt controller 16 receives one or more interrupt requests from the I/O subsystem 10 through the interrupt lines 15. Each of these interrupt requests is then converted into an appropriate interrupt message packet, 50 or 52, and transmitted over the non-coherent unidirectional link 36B. Thus, the I/O interrupt controller 16 is placed where I/O devices inject their interrupts into the system 40. In one embodiment, the I/O bridge 20 may be configured (in hardware or at run time) to add further routing and destination information to the message packets in FIGS. 6A and 6B. Alternatively, the system operating software may dynamically configure the target of the interrupt requests and may then forward the interrupt messages to the corresponding target local interrupt controllers at different processing nodes. In any event, the I/O interrupt controller 16 is generally never a target of an interrupt message except for the EOI message 54. However, the I/O interrupt controller 16 may not initiate an EOI message 54. Further, the local interrupt controller 44 in the host processing node 12D may also be identified as an interrupt message recipient in an interrupt message from the I/O interrupt controller 16.

FIGS. 7A and 7B represent two examples of interrupt response packets. The interrupt response packet 60 may be used to send a response to a lowest priority interrupt message, and the response packet 62 indicates a remote read interrupt response. All the fields in the remote read response packet 62 have been described earlier along with the remote read message 50. The lowest priority arbitration response packet 60 has two additional fields: (1) the focus bit [F] and (2) the 8-bit arbitration priority field [ARBP0–ARBP7] instead of the interrupt vector bits [V0–V7]. When a local interrupt controller receives a lowest priority interrupt message, it transmits a lowest priority interrupt response packet 60 to the interrupt controller that initiated the interrupt message. Generally, the lowest priority interrupt message is targeted to more than one local interrupt controllers, but eventually only one local interrupt controller is selected to service the lowest priority interrupt request. The ultimate target controller is selected based on whether the focus processor bit [the F bit] in the response packet 60 from that target local interrupt controller indicates an existence of a focus processor. If there is no focus processor in the system for a given lowest priority interrupt message, then the target interrupt controller that has the lowest arbitration priority as indicated by the ARBP field in the response packet 60 is selected to service the lowest priority interrupt. The lowest priority interrupt message initiator will then send an appropriate fixed interrupt message 50 with the selected local interrupt controller as the only interrupt message recipient.

The lowest priority (LP) arbitration response is defined to allow each local interrupt controller that is the recipient of the lowest priority interrupt message to respond with its arbitration priority back to the initiator. The initiator controller will wait for all the responses prior to determining the single recipient of the final fixed interrupt message. In one embodiment, the messaging protocol may add destination and routing information to the lowest priority interrupt message and lowest priority arbitration response packets so as to enable the initiator controller to decide how many responses to wait for. In another embodiment, each interrupt controller (I/O or local) may have a local agent count register that identifies the total number of local interrupt controllers or local agents in the system. When an interrupt message is broadcast to all local agents, the initiator of the message waits for the responses based on the count in the local agent count register. The remote read message packet 50, however, is targeted to only one local interrupt controller. Hence, in that situation, the initiator controller knows the identity of the recipient local controller and there may be no need for the initiator to figure out the number of responses to wait for as only one remote read response packet 62 may be received.

Referring back to FIG. 7A, in one embodiment, the arbitration priority values in the ARBP field may be inverted by the initiator controller receiving the LP arbitration responses. The interrupt controller supplying the highest inverted arbitration priority may be granted the lowest priority interrupt. When more than one interrupt controller returns the same value for the arbitration priority, then the initiator controller may employ any tie-breaking scheme, e.g. a random selection, to select the destination controller for the fixed message. The fixed interrupt message 50 to the interrupt controller selected as having the lowest priority or as having the focus processor may not require any further response packet from the final destination controller.

A processor is the focus of an interrupt if either it is currently servicing that interrupt or if it currently has a request pending for that interrupt. When the responding local interrupt controller declares a focus processor through the F bit in the response packet 60, the initiator delivers the interrupt only to that responding local interrupt controller even if there is another processor core with task priority lower than that of the focus processor. The focus processor may be termed to have an "affinity" for the interrupt. In one embodiment, if one of the processors has recently serviced a lowest priority interrupt, the corresponding local interrupt controller may be configured to supply the lowest possible arbitration priority in its LP arbitration response packet 60 to indicate the "fresh" state of the interrupt service routine in the local processor cache. This is because of the stronger "affinity" of the processor that has recently serviced a lowest priority interrupt with the same vector field as in the present lowest priority interrupt message. Each processing node may be configured to have one interrupt vector FIFO register per processor core. The vector register may contain entries for a fixed number of most recently service interrupts, for example for the five most recently serviced interrupts. Each entry in the vector FIFO may have the serviced interrupt vector in it so as to compare the current interrupt vector with the set of interrupt vectors in the FIFO.

As is known in the art, each processor has a processor or task priority that reflects the relative importance of the code the processor is currently executing. This code can be part of a process or thread, or can be an interrupt handler routine. A processor's priority fluctuates as a processor switches threads, a thread or handler raises and lowers processor priority level to mask out an interrupt, and the processor enters an interrupt handler and returns from an interrupt handler to previously interrupted activity. The processor priority at the time the corresponding local interrupt controller receives an interrupt message may determine whether the interrupt message will be accepted by the local controller or not.

In certain current interrupt distribution schemes, e.g. the interrupt messaging employed with the configuration in FIG. 1, a maximum of 240 interrupt vectors may be recognized by the multiprocessing system (assuming an 8-bit vector field). In reality, a total of 256 unique vectors ($2^8$) may be possible. The vectors of decimal 15 or lower are never used because "0" is the integer portion of 15 (or less) divided by 16 and the lowest processor task priority value is also "0". Therefore, in a configuration where 256 vectors are divided into 16 priority levels, the first sixteen vectors (vectors 0 to 15) may never be placed into service and may never be used. Generally, the priority of an interrupt must be greater than the value contained in the task priority register for the corresponding processor core in order for the local interrupt controller to place that interrupt into service.

Further, in a multiprocessing configuration similar to that in FIGS. 3 or 4, a deadlock situation may occur when two or more processing nodes simultaneously attempt to transmit similar interrupt messages with identical priority levels as under the current priority-based interrupt distribution schemes. This situation may occur, for example, when the processing nodes 12B and 12A simultaneously issue a fixed interrupt in a broadcast-to-all fashion, i.e. two discrete interrupt vectors but with the same priority. In some current interrupt protocols a fixed interrupt message requires that all target controllers accept the interrupt or everyone must reject it, and the interrupt message will then be retried by the message initiator. Based on the routing involved, and based on the physical proximity of the recipient node, the message from the processing node 12A will be received first by the node 12C and later by the node 12D. Similarly, the message by the node 12B will first be received by the node 12D and later by the node 12C. It is understood that all interrupt controllers do not receive a given message at the same time, and more than a single message can be in the system at any given time. A decision whether to accept or reject a message is made based on the priority of the message. Thus, when the processing node 12C accepts the fixed interrupt message from the processing node 12A, the interrupt message might occupy the last slot in that priority level. A similar situation may occur for the processing node 12D for the message from the node 12B. Thus, the processing node 12C may reject the fixed, broadcast-to-all message from the processing node 12B and the processing node 12D may similarly reject the message from the processing node 12A. This chain of events would require retry of individual broadcast messages because neither node 12A nor the processing node 12B would be able to complete their messages. Upon retry by the nodes 12A and 12B the same situation may recur. This may lead to potential deadlock and the system may hang.

To prevent such a problem from occurring, a scheme may be devised that eliminates priority-based vectored interrupt acceptance mechanism. In one embodiment, each local interrupt controller may be provided with a 240-bit IRR (interrupt request register) and a 240-bit ISR (interrupt status register) in case of an 8-bit long interrupt vector. Each vectored interrupt in the system may, thus, have a slot available for acceptance at the recipient processing node. Under such a hardware configuration, vectored interrupts may always be accepted or collapsed in their unique IRR bits. A local interrupt controller, under this configuration, may not need the storage for the vector number because each of the 240 possible vectored interrupts is accounted for. This scheme facilitates simultaneous transmission of interrupt message packets in a multiprocessing system that operates even under the current priority-based protocols. Additionally, the availability of bookkeeping for all 240 possible vectored interrupts in the system eliminates the need for all accept and retry message packets, e.g. in response to a fixed interrupt message.

Each local interrupt controller may be addressed either physically using physical ID or logically using a logical destination register. In physical addressing, either only one local interrupt controller (also known as local agent) can be addressed at a time or broadcast to all local agents can be done. In logical addressing, a group of local agents can be addressed through bit mapping in destination addressing and the logical destination register. Each local agent may gets its physical ID latched upon system reset and through the address pins of the corresponding processor core. Generally, each local interrupt controller receives a different physical ID to correctly identify an interrupt message recipient. Alternately, if local agent ID's are written by software then the software must be configured to read the ID's from a memory address space that is same for all processors but has different ID's for different local agents. This will ensure that the same code when executed by different CPUs will initialize respective local interrupt controller unit with a different ID. The I/O interrupt controller (or I/O agent) 16 may also be assigned its physical ID in a similar manner. In a symmetric multiprocessing environment, any processor core in the system 40 may initialize the I/O interrupt controller 16.

In one embodiment, a cluster addressing mode through the logical destination register in the interrupt message initiator (a local interrupt controller in case of an inter-processor interrupt and an I/O interrupt controller in case of an interrupt from an I/O device) is contemplated. In a 32-bit [bits 0–31] logical destination register and in a situation where the upper eight bits [bits 24–31] of the logical destination register are used for logical addressing, a maximum of eight different interrupt controllers may be addressed in a flat model of logical addressing. In a clustered model, the upper eight bits may be divided into two four-bit fields, for example, bits 24–27 may represent one field and bits 28–31 may represent another field. One four-bit field may identify a cluster of processing nodes and the other four-bit field may select one to four local interrupt controllers within the identified cluster. The system configuration in FIGS. 2 or 3 depicts one cluster of four processing nodes. In a larger multiprocessing system configuration the arrangement in FIGS. 2 or 3 may be replicated and more clusters may be formed. Two clusters may be interconnected via a hub (not shown) or via a controller port (not shown).

In another embodiment, the logical addressing space may be expanded to upper 16 bits [bits 16–31] in the logical destination register in the interrupt message initiator. When the logical addressing model is flat, a maximum of 16 different interrupt controllers may be addressed. In the clustered addressing model, the upper sixteen bits may be divided into two eight-bit fields, for example, bits 16–23 may represent one field and bits 24–31 may represent another field. One eight-bit field may identify a cluster of processing nodes and the other eight-bit field may select one to eight local interrupt controllers within the identified cluster. Hence, a total of 255 ($2^8-1$) clusters with each cluster containing eight processing nodes (assuming only one local agent per processing node) may be selected. Broadcast to all (255) clusters and to a maximum of eight local interrupt controllers in each cluster may be achieved by setting all the bits in the bit positions 16–31 to logic one. Similarly, in the four-bit cluster addressing, a total of 15 ($2^4-1$) clusters with each cluster containing four processing nodes (assuming only one local agent per processing node) may be selected. Finally, broadcast to all (15) clusters and to a maximum of four local interrupt controllers in each cluster may be achieved by setting all the bits in the bit positions 24–31 to logic one.

Figure 9A:
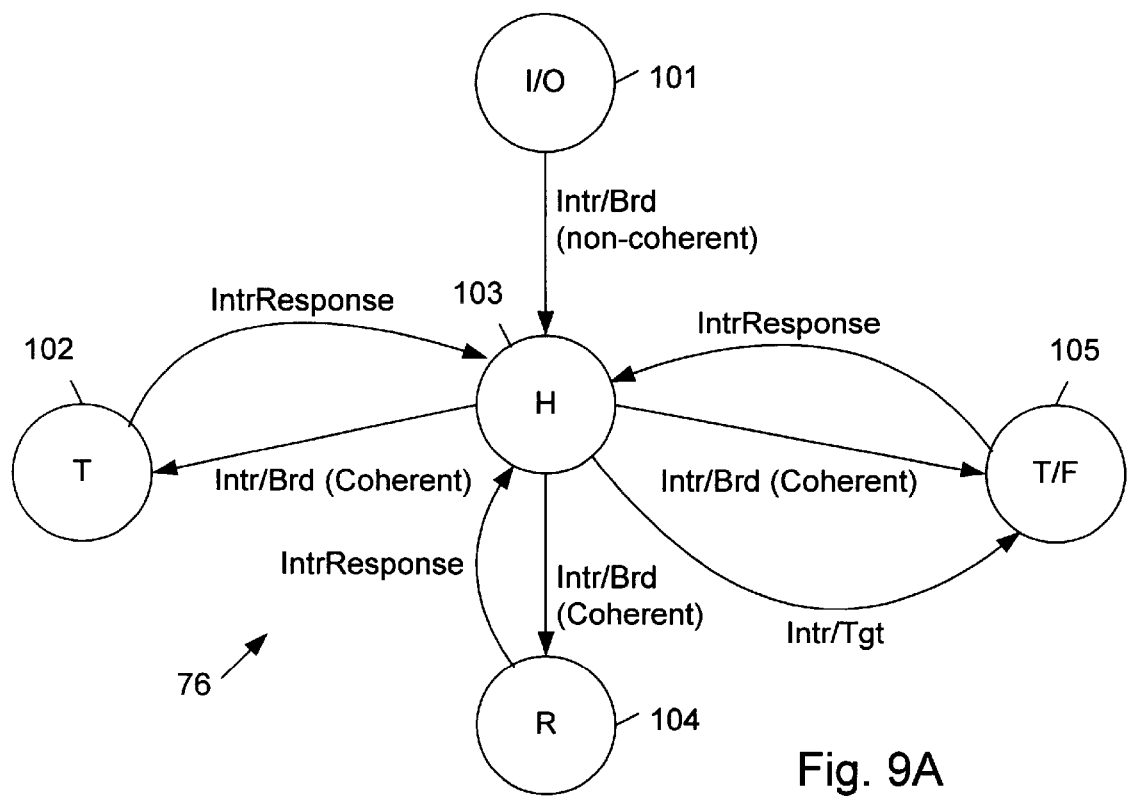
FIG. 9A depicts an example flow of interrupt packets during lowest priority interrupts.
Figure 9B:
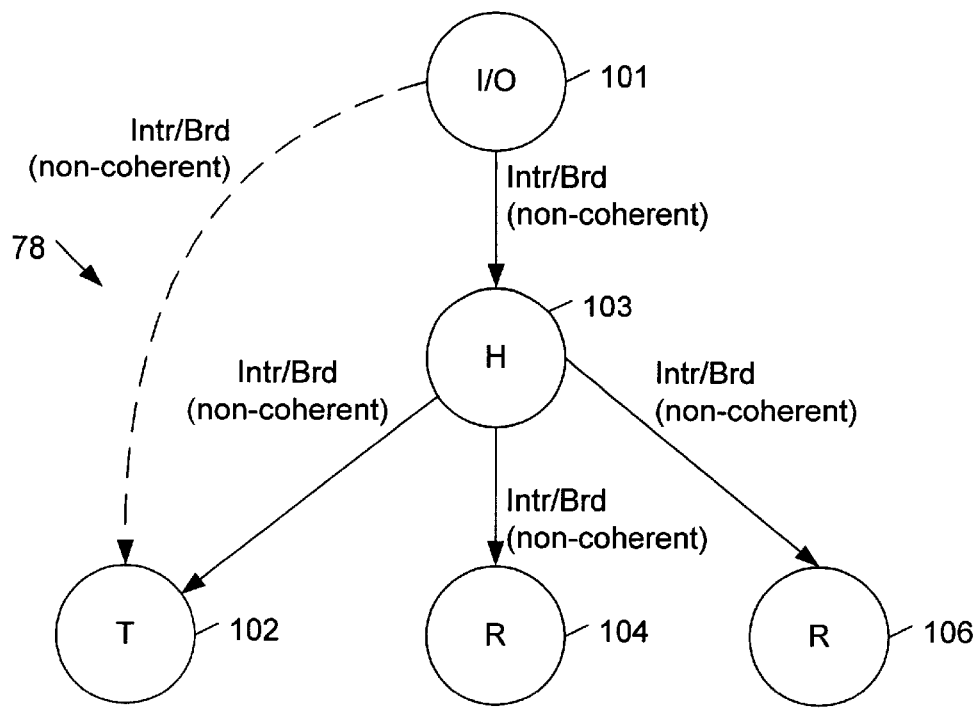
FIG. 9B depicts an example flow of interrupt packets during fixed and non-vectored interrupts.

Referring now to FIGS. 9A and 9B (along with FIGS. 10A and 10B), two illustrations, 76 and 78, of flow of packets among various processing nodes in the multiprocessing system of FIG. 3 (or FIG. 2, as the case may be) are shown. The flow of interrupt packets 76 depicted in FIG. 9A takes place during a lowest priority interrupt request. FIG. 9B, however, depicts a flow 78 of interrupt packets during a fixed priority, an ExtINT or a non-vectored interrupt request. The encircled letter I/O 101 in FIGS. 9A/9B may indicate the I/O bridge 20 in FIG. 3 as an interrupt packet initiator. One or more of the processing nodes 12A–12D may also generate an interrupt packet, e.g. during an inter-processor interrupt operation. The encircled letter H 103 may denote the host processing node 12D.

In FIG. 9A, the I/O bridge 20 transmits an interrupt broadcast command packet 82 (Intr/Brd) over the non-coherent unidirectional link 36B (FIG. 3). The Intr/Brd packet 82 identifies the interrupt as a lowest priority interrupt and also identifies one or more target processing nodes that are recipient of the lowest priority interrupt request. The host processing node 12D is configured to convert the Intr/Brd packet 82 transmitted over the non-coherent unidirectional link 36B into an Intr/Brd packet 80 that is suitable for transmission among various processing nodes over the coherent links 34. The host processing node 103, then, transmits the coherent Intr/Brd packet 80 to all of the remaining processing nodes 12A–12C in the system 40 regardless of whether the Intr/Brd packet 82 from the I/O bridge 20 identifies each of the remaining processing nodes 12A–12C as a target of the lowest priority interrupt request.

The encircled letter T 102 indicates one or more processing nodes that are identified as a target in the Intr/Brd command 82 from the I/O bridge 101. The encircled letter T/F 105 indicates a processing node, other than the processing nodes represented by circle 102, that is also a target of the lowest priority interrupt request. However, the processing node 105 is different from the processing node 102 in that the node 105 claims availability of a focus processor for the lowest priority interrupt. The encircled letter R 104, finally, denotes one or more of the remaining processing nodes in a multiprocessing system that are not identified as potential targets in the Intr/Brd command 82 from the I/O bridge 101. In the system 40 of FIG. 3, as way of example only, the node 12A may just be the target node 102, the node 12B may be the target node with a focus processor 105, and the node 12C may be the remaining node 104.

Each node in FIG. 9A transmits back an interrupt response (IntrResponse) packet 96 (FIG. 13A) to the host processing node 103 in response to the Intr/Brd command (coherent) 80 from the host node 103. The host node 103 collects all the interrupt responses and then sends a fixed interrupt via an Intr/Tgt packet 94 (FIG. 12) either to the processing node with a focus processor (node 105 in FIG. 9A) or to the processing node with the lowest arbitration priority when no focus processor is claimed. Any suitable tie-breaking algorithm may be employed in the event of two or more processors responding with the same lowest arbitration priority. In an alternative embodiment, the host processing node may, instead, forward all the collected interrupt responses to the I/O interrupt controller 16, which, in turn, may identify the processing node claiming a focus processor or, in the absence of such a focus processor, the processing node having the lowest arbitration priority. The I/O interrupt controller may, then, send the Intr/Tgt packet 94 (FIG. 12) (via the host processing node) to the processing node that is selected to receive the lowest priority interrupt.

FIG. 9B, as mentioned earlier, depicts a flow 78 of interrupt packets during a fixed priority interrupt request or a non-vectored interrupt request. Non-vectored interrupts may include an NMI (non-maskable interrupt) interrupt, an SMI (system management interrupt) interrupt, an INIT (initialization interrupt) interrupt and a Startup interrupt. As an ExtINT (external interrupt) interrupt from an I/O device is quite similar to a fixed interrupt, the flow of packets 78 in FIG. 9B may also apply to an ExtINT request. In FIG. 9B, the I/O node 101 (e.g., the I/O bridge 20 in FIG. 3) transmits an interrupt broadcast command packet 82 (Intr/Brd) over a non-coherent link (e.g., link 36B in FIG. 3). The host node 103 (e.g., node 12D in FIG. 3) receives the non-coherent Intr/Brd packet 82 from the I/O node and simply forwards that packet to all other nodes in the system. The host node 103 forwards the interrupt packet 82 irrespective of whether the interrupt packet identifies each of the remaining processing nodes (e.g., nodes 12A–12C in FIG. 3) as a target for the fixed, non-vectored or ExtINT interrupt represented by the Intr/Brd packet 82.

Under the interrupt messaging protocol for FIG. 9B, the host node 103 does not perform a conversion from a non-coherent packet form into a packet form suitable for transmission over coherent links. Hence, effectively, the I/O node 101 may be visualized as transmitting the Intr/Brd packet 82 directly to the target node 102 as shown by the dotted directional arrow in FIG. 9B. A similar broadcast of Intr/Brd (coherent) packets 80 may occur during an inter-processor interrupt. In FIG. 9B, as way of example only, the node 12A may be the target node 102, the node 12B may be one of the remaining nodes 104, and the node 12C may be the other remaining node 106.

The interrupt response packets are needed in FIG. 9A to determine the lowest priority processor from among many processors in the system. However, in the embodiment of FIG. 9B, no response packet need be transmitted to the host processing node 103 (e.g., node 12D in FIG. 3) because a non-vectored or an ExtINT interrupt may not be rejected by the receiving local interrupt controller. Further, as previously described, each local interrupt controller may be provided with a 240-bit IRR (interrupt request register) and a 240-bit ISR (interrupt status register) in case of an 8-bit long interrupt vector. Each vectored interrupt in the system may, thus, have a slot available for acceptance at the recipient processing node. Under such a hardware configuration, interrupts may always be accepted or collapsed in their unique IRR bits. Hence, a fixed priority interrupt (or any other vectored interrupt) may also not be rejected at the target local interrupt controller. This eliminates the need to transmit any accept/retry messages within the multiprocessing system. A more efficient utilization of high-speed dual-unidirectional link architecture may thus be achieved through link bandwidth conservation.

Referring now to FIGS. 10A and 10B, two examples of interrupt broadcast packets (Intr/Brd packet)—one for coherent links and the other for non-coherent links—are respectively shown. Each interrupt broadcast packet 80 or 82 comprises seven binary fields. The command field (CMD [5:0]) is the same for both of these packets and identifies them as interrupt broadcast message packets. A sample encoding for the CMD field in various interrupt packets is shown in table 93 in FIG. 11C. The DM bit indicates the addressing mode: physical mode using the physical ID of a local interrupt controller or logical mode using a logical destination register. An exemplary encoding for the DM bit is shown in the table 92 in FIG. 11B. The TM bit indicates the trigger mode (edge or level) and may be encoded similar to that shown in table 72 in FIG. 8B. The message type field (MT[2:0]) identifies the type of the interrupt message represented by the corresponding interrupt broadcast packet.

One sample encoding for the message type field is depicted in the table 90 in FIG. 11A. In this embodiment the message type field is of three-bit length as opposed to a similar MT field in FIG. 8A. The embodiment does not support remote reads, and hence the message type field in FIG. 11A excludes codes for the remote read message and the remote read response packets. Further, the message type field in FIG. 11A depicts only one encoding for a lowest priority interrupt message. The encoding for the lowest priority arbitration response in FIG. 8A is absent in the configuration of FIG. 11A because of the availability of an independent interrupt response packet 96 (FIG. 13A). As the broadcast packet 80 is used over a coherent link, the message type field in the interrupt broadcast packet 80 in FIG. 10A may not indicate an ExtINT message because a local interrupt controller may not generate an ExtINT interrupt.

As mentioned earlier, each processing node 12A–12D may be configured to receive an interrupt message (e.g., FIGS. 6A–6C) or an interrupt response packet (e.g., FIGS. 7A–7B) from the corresponding local interrupt controller within the respective processing node. The processing nodes may add corresponding destination and routing information to the interrupt messages received from the corresponding local interrupt controller. The complete interrupt packet, e.g., the interrupt broadcast packet 80, is then transmitted over appropriate coherent links within the system. Similarly, the I/O bridge 20 may be configured to generate a corresponding non-coherent interrupt packet, e.g., the interrupt broadcast packet 82, from an interrupt message received from the I/O interrupt controller 16. In one embodiment, there may be more than one processor core within a processing node, and hence there may be more than one local interrupt controllers within that processing node. Additional bits may be added to an interrupt packet to identify a specific local interrupt controller within the processing node. In the absence of such additional bits, however, the processing node may be configured to assign the received interrupt packet to one of the internal local interrupt controllers according to any suitable distribution algorithm including, for example, a random assignment. In case of multiple local interrupt controllers within a processing node, the protocol may be designed so that an interrupt packet identifies only the processing node. Routing of the interrupt packet to appropriate internal local interrupt controller may be done solely by the recipient processing node itself.

In one embodiment, the interrupt broadcast packets, 80 and 82, may be used to convey a lowest priority, a fixed, an SMI, an NMI, an INIT and a Startup interrupt messages. The Intr/Brd packet 82 may additionally be used to convey an ExtINT message. The directed interrupt packet 94 (Intr/Tgt packet) (FIG. 12) may only be used over a coherent link and to direct a fixed priority interrupt to the winner of a lowest priority arbitration transaction or to convey an EOI message. Finally, each responding processing node may use the interrupt response packet 96 (FIG. 13) for lowest priority arbitration response.

Referring again to FIG. 10A, the source node field (SrcNode[3:0]) identifies the physical node that is the originator of the Intr/Brd packet 80. The SrcNode field is of four bits in length. Hence, a maximum of 16 processing nodes may simultaneously transmit a corresponding Intr/Brd packet 80 into the system 40. In this embodiment, a single processing node may not send at any given time more than one Intr/Brd packets for more than one distinct lowest priority interrupt transactions. Only one transaction per processing node at a given time may be allowed. In an alternative embodiment, one or more processing nodes may have more than one Intr/Brd packets active in the system at a time.

A similar SrcNode field is absent in the non-coherent Intr/Brd packet 82 in FIG. 10B. Instead, a pipe ID field (PipeID[4:0]) is provided. As previously mentioned, a non-coherent link, e.g., the link 36B, may carry interrupt requests from more than one initiators (e.g., I/O devices, graphics devices, other I/O bridges etc.) or functions. A coherent link, however, may carry messages from only one processing node because of the way two adjacent processing nodes are interconnected. The PipeID field, hence, identifies the interrupt requesting function for a given Intr/Brd packet from the I/O bridge 20. The device sending an interrupt request may be comprised in the I/O subsystem 10 or may be part of the I/O bridge 20. The five-bit long PipeID field may support a total of 32 different interrupt sources via one I/O bridge 20. In one embodiment, each I/O bus in the system may be assigned a distinct PipeID to facilitate interrupt message and response routing.

The interrupt destination field (IntrDest[7:0]) has the same meaning for both of the Intr/Brd packets 80, 82. The eight-bit interrupt destination field identifies the destination processing node (e.g., in physical destination mode) for the Intr/Brd packet. A total of 255 processing nodes may be addressed in the physical destination mode. The all 1's IntrDest field may be used in case of a broadcast-to-all message. The logical destination mode and cluster addressing may be implemented through the IntrDest vector. Each recipient local interrupt controller may compare the IntrDest field in the received interrupt packet, 80 or 82, against the upper eight bits [e.g., bits 24–31 for a 32-bit logical destination register] in its internal logical destination register. A match in one or more bit positions may indicate that the recipient local agent is one of the targets of the interrupt packet. In case of a 16-bit long interrupt destination field, a logical addressing mode with the logical destination register expanded to upper 16 bits (bits 16–31) may be implemented. The cluster addressing mode may be implemented as earlier described.

In the protocol under which the arrangement in FIG. 9A operates, the host node 103 broadcasts each interrupt broadcast message (from the I/O node 101) to every other remaining processing node in the system. A similar broadcast operation is performed for fixed, ExtINT and non-vectored interrupts as depicted in FIG. 9B except that the host node 103 in FIG. 9B does not convert the interrupt packet received from the I/O node 101 into a corresponding packet suitable for transmission over coherent links. As mentioned earlier with reference to FIG. 6A, an ExtINT message is similar to a fixed interrupt except that the targeted processor(s) discards the vector information contained in the Intr/Brd packet 82. The targeted processor(s), instead, generates an interrupt acknowledge cycle to retrieve the pertinent vector from the interrupt message initiator, i.e. the I/O node 101. In an inter-processor interrupt situation, the host node 103 itself may be the interrupt message initiator and may also perform similar broadcast operations as in FIGS. 9A and 9B using coherent Intr/Brd packets 80.

One reason behind performing a broadcast of an interrupt packet is that the interrupt messaging protocol may not allow the host node 103 to perform a decoding of the IntrDest field especially when the DM bit indicates a logical destination mode. The host node 103 may, instead, be configured to simply broadcast each interrupt packet irrespective of whether the addressing mode is physical or logical. This implies that the host node 103 may not actually know how many nodes are actual targets specified in the interrupt message packet that is being broadcast. Hence, for a lowest priority interrupt packet, each recipient node may be required to transmit a corresponding interrupt response packet 96 (FIG. 13A) to the host node 103 to allow for the determination of the final lowest priority node. In case of a fixed, ExtINT or a non-vectored interrupt message, no interrupt response packet is needed because these interrupts may not be rejected once a recipient local interrupt controller identifies itself as a target specified in the interrupt message packet. The target local interrupt controller, thus, simply services the interrupt without sending any response to the host node 103 as a response may not be needed in case of a fixed, ExtINT or a non-vectored interrupt.

The vector field (Vector[7:0]) in FIGS. 10A and 10B is identical and refers to the interrupt vector supplied by the interrupt message initiator—an I/O interrupt controller or a local interrupt controller—for a given interrupt message. The vector field and the TM bit (trigger mode) may not be used or may be reserved for an SMI, an NMI, a startup or an INIT interrupts.

It is noted that once the I/O node 101 transmits the Intr/Brd (non-coherent) packet 82 to the host node 103, no further transaction may occur between the I/O node 101 and the host node 103. All future transactions in the system, including the determination of the lowest priority arbitration, may be handled only by the host node 103. In an inter-processor interrupt the message from the I/O node (Intr/Brd or Intr/Tgt) would be absent. However, the processing node initiating the interrupt may perform as a host node and may broadcast the interrupt message packet in the same manner as depicted in FIGS. 9A and 9B.

A local interrupt controller in the host node 103 may be a target of the interrupt message from the I/O node 101. The local interrupt controller in the host node 103 may receive the Intr/Brd (non-coherent) packet 82 or the Intr/Tgt packet 94 and may decode the interrupt destination field to ascertain whether it is the target of a given interrupt message. Under the interrupt messaging protocol for FIGS. 9A and 9B, the host node 103, however, may continue the message conversion and broadcasting (FIG. 9A) or message forwarding (FIG. 9B). In such an interrupt messaging protocol, the local interrupt controller at the host node 103 may even start servicing certain interrupt requests before any responses from other nodes are processed by that local interrupt controller. However, for a lowest priority interrupt in FIG. 9A, the host node local interrupt controller must wait for all responses. Each response is then processed by the host node local interrupt controller to determine the processing node with a focus processor or a lowest priority processing node when there is no node with a focus processor.

Referring now to FIG. 11C, an exemplary encoding 93 for the command field (CMD[5:0]) in various interrupt packets is shown. In the multiprocessing systems of FIGS. 2 and 3 there may be a number of different kinds of binary packets being transferred between two processing nodes or between a processing node and an I/O bridge. An interrupt packet may be classified as either a command packet or a response packet. Some examples of a command packet include the interrupt broadcast packets in FIGS. 10A and 10B, as well as the directed interrupt packet 94 in FIG. 12. An interrupt response packet is shown in FIG. 13A. As mentioned earlier with reference to FIG. 4, the control line in a unidirectional link may be asserted to indicate a control packet, and deasserted to indicate a data packet. Generally, the interrupt packets in FIGS. 10A, 10B, 12 and 13A may be considered as control packets. In the message types identified in FIG. 11A, no data movement is involved.

Each interrupt packet is illustrated as a series of bit times enumerated under the "bit time" heading. As mentioned previously, the amount of time employed to transmit one bit per line is referred to as a "bit time." Each interrupt packet is transmitted over four bit times for an 8-bit implementation of the command/address/data bus. For a 16-bit wide command/address/data bus, the same interrupt packet may be transmitted over two bit times. Accordingly, eight bits (numbered seven through zero) of interrupt packet information is transferred over an eight-bit command/address/data bus during each bit time. Bits for which no value is provided in the figures may either be reserved for a given packet, or may be used to transmit packet-specific information.

Referring now to FIG. 12, an example of a directed interrupt packet 94 (Intr/Tgt packet) is shown. The directed interrupt packet 94 may be used only over a coherent link and to direct a fixed priority interrupt to the winner of a lowest priority arbitration transaction or to convey an EOI message. This implies that the I/O node 101 may not be an originator of an Intr/Tgt packet 94. The packet in FIG. 12 may be used to carry an EOI message from a responding local interrupt controller. The directed interrupt packet 94 may thus generally be used to transmit an appropriate interrupt message to a particular physical destination node in the system.

The CMD field in the Intr/Tgt packet 94 identifies the packet as an interrupt target packet (FIG. 11C). The target node field (TgtNode [3:0]) is similar to the source node field (SrcNode[3:0]) and identifies one or more processing nodes (depending on the DM bit) as the targets for an interrupt request conveyed by the directed interrupt packet 94. The SrcNode field, the MT field, the TM and DM bits, and the Vector field in the directed interrupt packet 94 are similar in function to those in the interrupt packets in FIGS. 10A and 10B.

FIG. 13A depicts an example of an interrupt response packet 96 (IntrResponse) to convey a response to a lowest priority interrupt packet (e.g., the Intr/Brd packet 80 in FIG. 10A). The command field identifies the packet 96 as an interrupt response packet (FIG. 11C). The target node field (TgtNode [3:0]) identifies the processing node to which the response packet 96 is being sent, i.e. the host node 103 in FIG. 9A. The responding node field (RespNode [3:0]) identifies the processing node that is supplying the response packet 96. As is evident from the diagram in FIG. 9A, the interrupt response packet 96 may only be used over a coherent link. The response packet 96 may also be used during an inter-processor lowest priority interrupt. Each local interrupt controller that receives the Intr/Brd (coherent) packet 80 from the host node 103 generates appropriate lowest priority arbitration information. The responding processing node adds proper routing and destination information to the lowest priority arbitration response from its local interrupt controller and transmits the arbitration information via an interrupt response packet.

All nodes in FIG. 9A receive the lowest priority broadcast message and determine through their corresponding local interrupt controllers whether they are one of the targeted destinations for the lowest priority interrupt. All nodes must respond whether they are being targeted or not. This target information is conveyed through the lowest priority arbitration information field (LpaInfo[1:0]). A sample encoding 98 for the LpaInfo field is shown in FIG. 13B. Nodes that are not targeted indicate such information in the LpaInfo field of the response packet 96. Each node that is targeted supplies that information in the LpaInfo field of its response packet, and places its interrupt priority in the priority field (Priority [7:0]) of the response packet 96. A node that claims a focus processor for the lowest priority interrupt may also indicate so in the LpaInfo field.

Finally, it is noted that in the interrupt messaging protocol for FIGS. 9A and 9B the mapping between physical destination mode (as may be used in the SrcNode and the TgtNode fields) and logical destination mode (as may be needed to address individual local interrupt controllers in different processing nodes) may be done in hardware through each local interrupt controller within a corresponding processing node that is the recipient of an interrupt packet. The software need not be used to program physical-to-logical maps other than those already existing in various registers inside the local and I/O interrupt controllers. In one embodiment, the task priority register (TPR) in a local interrupt controller may be designed to be physically close to the corresponding processor core due to the frequency at which the software accesses the TPR.

The foregoing discloses different embodiments of an interrupt messaging scheme for a multiprocessing computer system. Interrupt responses may preferably be decoupled from corresponding interrupt messages. Interrupt packets may be routed among the processing nodes in the system without any dedicated interrupt bus. A dual-unidirectional link architecture may be employed to transfer various packets in the system. In the absence of a wired-or interrupt bus, the speed of interrupt message transfer may be increased. The interrupt messaging protocol may no longer depend on the underlying physical characteristics of a bus, and may be used with any bus architecture—e.g. a point-to-point dual-unidirectional link architecture. Simultaneous transmission of more than one interrupt messages within the system may also be accomplished. Certain interrupt responses need not be transmitted, thereby conserving system bus bandwidth and eliminating delays involved in waiting for interrupt responses. Rejection of an interrupt in the multiprocessing system may be avoided, thereby eliminating the need for accept/retry messages.

While the invention is susceptible of various modifications and alternative forms, specific embodiments thereof are shown by way of examples in the drawings and are herein described in detail. It should be understood, however, that the drawings and detailed description thereto are not intended to limit the invention to the particular forms disclosed, but on the contrary, the intention is to cover all such modifications, equivalents and alternatives as may fall within the spirit and scope of the present invention as defined by the appended claims.

What is claimed is:

1. A multiprocessing computer system comprising:
   an I/O subsystem;
   an I/O interrupt controller coupled to receive a first interrupt request from said I/O subsystem and to responsively generate a first interrupt message;
   a plurality of processing nodes, wherein each of said plurality of processing nodes includes:
   a corresponding processor core, and
   a corresponding local interrupt controller coupled to said corresponding processor core,
   wherein a first processing node of said plurality of processing nodes is coupled to receive said first interrupt message, wherein said first processing node is configured to determine a first interrupt message recipient for said first interrupt message, wherein said first interrupt message recipient includes at least one of said plurality of processing nodes; and
   a plurality of dual-unidirectional links, wherein each dual-unidirectional link interconnects a respective pair of processing nodes from said plurality of processing nodes, wherein said first processing node is configured to generate a first interrupt command from said first interrupt message and to route said first interrupt command to said first interrupt message recipient through a first one of said plurality of dual unidirectional links without having to arbitrate for said first one of said plurality of dual unidirectional links.

2. The multiprocessing computer system according to claim 1, wherein said each dual-unidirectional link performs packetized information transfer and includes a pair of unidirectional buses comprising:
   a transmission bus carrying a first plurality of binary packets; and
   a receiver bus carrying a second plurality of binary packets.

3. The multiprocessing computer system as in claim 1, wherein said each of said plurality of processing nodes further includes:
   a corresponding plurality of interface ports, wherein said corresponding local interrupt controller in said each of said plurality of processing nodes is coupled to at least one of said corresponding plurality of interface ports.

4. The multiprocessing computer system of claim 3, wherein said corresponding local interrupt controller in said first processing node is configured to process said first interrupt message to determine said first interrupt message recipient therefrom.

5. The multiprocessing computer system as in claim 4, wherein said corresponding local interrupt controller in said first processing node is configured to directly receive said first interrupt message from said I/O interrupt controller.

6. The multiprocessing computer system of claim 3, wherein said each dual-unidirectional link connects a respective pair of interface ports from said respective pair of processing nodes to thereby interconnect said respective pair of processing nodes.

7. The multiprocessing computer system of claim 3, wherein said corresponding local interrupt controller in a second processing node of said plurality of processing nodes is configured to receive a second interrupt request from said corresponding processor core in said second processing node and to responsively generate a second interrupt message,
   wherein said second processing node is configured to determine a second interrupt message recipient from said second interrupt message, wherein said second interrupt message recipient includes at least one remaining processing node in said plurality of processing nodes, and
   wherein said second processing node is further configured to generate a second interrupt command from said second interrupt message and to route said second interrupt command to said second interrupt message recipient through a second one of said plurality of dual-unidirectional links.

8. The multiprocessing computer system as recited in claim 7, wherein said first and said second one of said plurality of dual-unidirectional links are identical.

9. The multiprocessing computer system as in claim 7, wherein said first interrupt command and said second interrupt command are routed simultaneously.

10. The multiprocessing computer system according to claim 7, wherein each of said first and said second interrupt commands comprises:
    a first plurality of bits identifying the following:
       a corresponding one of said first and said second interrupt message recipients, and
       an interrupt message initiator that includes one of the following:
          said first processing node, and
          said second processing node; and
    a second plurality of bits comprising:
       a corresponding one of said first and said second interrupt messages.

11. The multiprocessing computer system of claim 10, wherein at least one of said first and said second interrupt commands comprises a third plurality of bits implementing a communication error detection scheme.

12. The multiprocessing computer system according to claim 9, wherein said corresponding local interrupt controller in said each of said plurality of processing nodes includes a storage for 240 vectored interrupts.

13. The multiprocessing computer system as in claim 9, wherein said first interrupt message comprises:
    a first plurality of bits defining a message type; and
    a second plurality of bits supplying an interrupt vector.

14. The multiprocessing computer system of claim 13, wherein said first interrupt message further includes a trigger mode bit to identify said first interrupt request as one of the following:
    an edge-triggered interrupt; and
    a level-triggered interrupt.

15. The multiprocessing computer system as in claim 14, wherein said message type identifies said first interrupt message as a lowest priority interrupt message, and wherein said corresponding local interrupt controller in said first interrupt message recipient is configured to process said lowest priority interrupt message and to generate a reply message, wherein said first interrupt message recipient is configured to route said reply message to said first processing node through a third one of said plurality of dual-unidirectional links, and wherein said reply message includes:
    said first plurality of bits defining said message type as a lowest priority arbitration response;
    a focus processor bit to indicate whether said corresponding processor core in said first interrupt message recipient is a focus processor for said lowest priority interrupt message; and
    a third plurality of bits supplying an arbitration priority of said corresponding processor core in said first interrupt message recipient.

16. The multiprocessing computer system according to claim 15, wherein said first processing node is configured to forward said reply message to said I/O interrupt controller through said bidirectional data link, wherein said I/O interrupt controller is configured to process said reply message to determine a lowest priority processing node therefrom, wherein said I/O interrupt controller is further configured to responsively generate a third interrupt message and transmit said third interrupt message to said first processing node, wherein said first processing node is configured to route said third interrupt message to said lowest priority processing node through a fourth one of said plurality of dual-unidirectional links, and wherein said third interrupt message includes:
    said first plurality of bits defining said message type as a fixed priority interrupt message;
    said second plurality of bits supplying said interrupt vector, and
    said trigger mode bit.

17. The multiprocessing computer system as in claim 14, wherein said message type identifies said first interrupt message as one of the following:

a fixed priority interrupt message;

a lowest priority interrupt message; and an external interrupt (EXTINT) message.

18. The multiprocessing computer system of claim 17, wherein said trigger mode bit identifies said first interrupt request as said level-triggered interrupt, and wherein said corresponding local interrupt controller in said first interrupt message recipient is configured to transmit a response message to said I/O interrupt controller, wherein said first interrupt message recipient is configured to route said response message to said first processing node through a third one of said plurality of dual-unidirectional links, and wherein said corresponding local interrupt controller in said first processing node is configured to transfer said response message to said I/O interrupt controller through one of said corresponding plurality of interface ports within said first processing node.

19. The multiprocessing computer system according to claim 18, wherein said response message includes:

said first plurality of bits defining said message type as an end of interrupt (EOI) message; and said second plurality of bits containing said interrupt vector.

20. The multiprocessing computer system as in claim 13, wherein said interrupt vector is absent from said first interrupt message, and wherein said message type identifies said first interrupt message as one of the following:

a system management interrupt (SMI) message;

a non-maskable interrupt (NMI) message;

a startup interrupt message; and an initialization interrupt (INIT) message.

21. The multiprocessing computer system of claim 13, wherein said message type identifies said first interrupt message as a remote read interrupt message and wherein instead of said interrupt vector said second plurality of bits supply an address of a register in said corresponding local interrupt controller in said first interrupt message recipient, and wherein said corresponding local interrupt controller in said first interrupt message recipient is configured to process said remote read interrupt message and to generate a reply message, wherein said first interrupt message recipient is configured to route said reply message to said first processing node through a third one of said plurality of dual-unidirectional links, and wherein said reply message includes:

said first plurality of bits defining said message type as a remote read response; and a third plurality of bits conveying a content of said register in said corresponding local interrupt controller in said first interrupt message recipient.

22. The multiprocessing computer system as recited in claim 21, wherein said content of said register is 32 bits in length.

23. The multiprocessing computer system of claim 1 wherein said I/O interrupt controller is coupled to transmit said first interrupt message through a bi-directional data link.

24. In a multiprocessing computer system including:

an I/O subsystem, an I/O interrupt controller coupled to said I/O subsystem, a plurality of processing nodes, wherein a first processing node of said plurality of processing nodes is coupled to said I/O interrupt controller, and a plurality of dual-unidirectional links, wherein each dual-unidirectional link interconnects a respective pair of processing nodes from said plurality of processing nodes, a method for distributing interrupts within said multiprocessing computer system, said method comprising:

said I/O interrupt controller receiving an interrupt request from said I/O subsystem;

said I/O interrupt controller generating an interrupt message in response to said receiving said interrupt request;

said I/O interrupt controller transmitting said interrupt message to said firstprocessing node;

said first processing node receiving said interrupt message and determining an interrupt message recipient therefrom, wherein said interrupt message recipient includes at least one of said plurality of processing nodes;

said first processing node generating an interrupt command from said interrupt message; and said first processing node routing said interrupt command to said interrupt message recipient through a first one of said plurality of dual-unidirectional links without having to arbitrate for said first one of said plurality of dual-unidirectional links.

25. The method as in claim 24, wherein said transmission of said interrupt message by said I/O interrupt controller and said reception of said interrupt message by said first processing node are through a bi-directional data link interconnecting said I/O interrupt controller and said first processing node.

26. The method of claim 24, further comprising:

said interrupt message recipient processing said interrupt command and generating a reply message in response thereto; and said interrupt message recipient routing said reply message to said first processing node through a second one of said plurality of dual-unidirectional links.

27. The method as recited in claim 26, further comprising:

first processing node transferring said reply message to said I/O interrupt controller.

* * * * *

UNITED STATES PATENT AND TRADEMARK OFFICE
CERTIFICATE OF CORRECTION

PATENT NO. : 6,205,508 B1 Page 1 of 1
DATED : March 20, 2001
INVENTOR(S) : Joseph A. Bailey and Norman M. Hack It is certified that error appears in the above-identified patent and that said Letters Patent is hereby corrected as shown below:

Claim 27, column 28,
Line 53, please insert "said" before "first".

Signed and Sealed this

Sixteenth Day of October, 2001

Attest:

*Nicholas P. Godici*

NICHOLAS P. GODICI
*Attesting Officer*    *Acting Director of the United States Patent and Trademark Office*